United States Patent [19]

Fukuoka

[11] 4,034,431

[45] July 12, 1977

[54] METHOD FOR MANUFACTURING A FOOTWEAR

[76] Inventor: Tatsuo Fukuoka, 3, 3-Ban, 2-Chome, Shin-Minami-Fukushima, Tokushima, Japan

[21] Appl. No.: 629,116

[22] Filed: Nov. 5, 1975

Related U.S. Application Data

[63] Continuation-in-part of Ser. No. 511,243, Oct. 2, 1974, Pat. No. 3,952,358, which is a continuation-in-part of Ser. No. 402,967, Oct. 3, 1973, abandoned.

[51] Int. Cl.² .................. A43D 9/00; A43B 3/14
[52] U.S. Cl. ......................... 12/142 MC; 36/11
[58] Field of Search ............ 12/142 R, 142 MC; 36/11

[56] References Cited

U.S. PATENT DOCUMENTS

| 1,388,120 | 8/1921 | Pope | 12/142 MC |
|---|---|---|---|
| 2,014,094 | 9/1935 | Wiggin | 36/11 |
| 2,200,068 | 5/1940 | Levin et al. | 36/11 |
| 2,718,715 | 9/1955 | Spilman | 36/11 |
| 3,952,358 | 4/1976 | Fukuoka | 36/11 |

Primary Examiner—Patrick D. Lawson

[57] ABSTRACT

A method for manufacturing a footwear, comprising a three-dimensionally molded lateral side section of thermosetting or thermoplastic resinous material, an upper vamp section integrally formed with, or separately connected to, said lateral side section and a sole integrally formed with or separately connected to the lateral side section.

6 Claims, 87 Drawing Figures

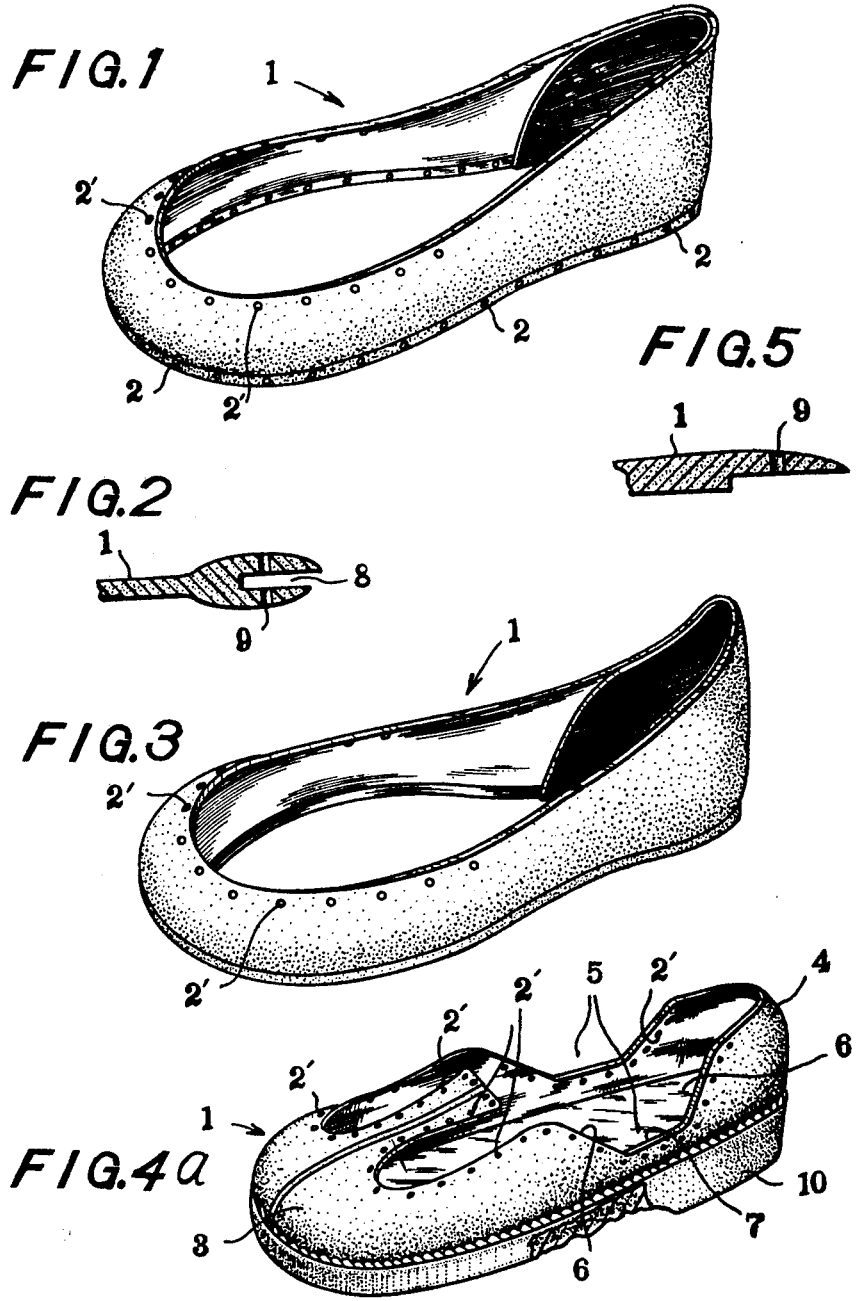

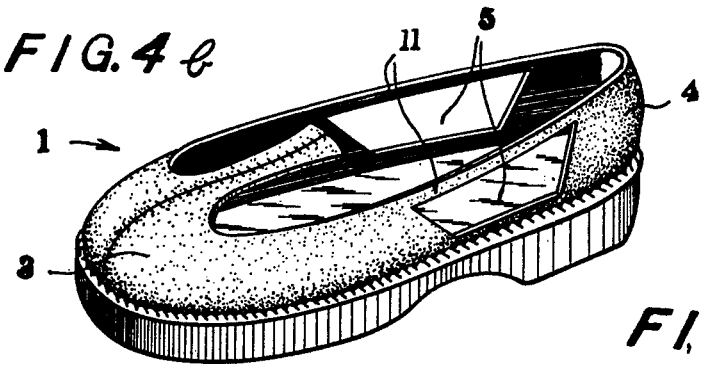
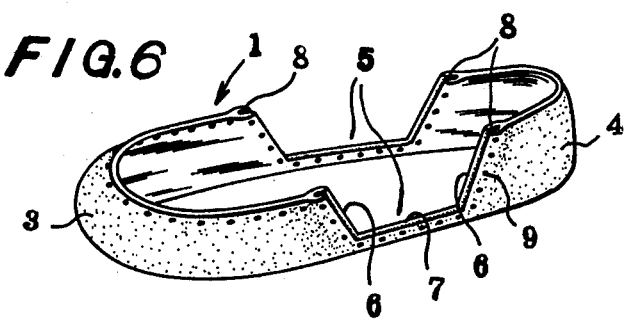
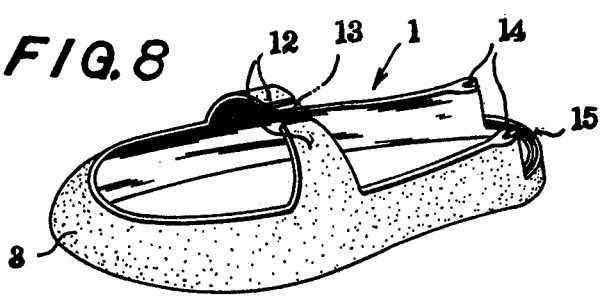

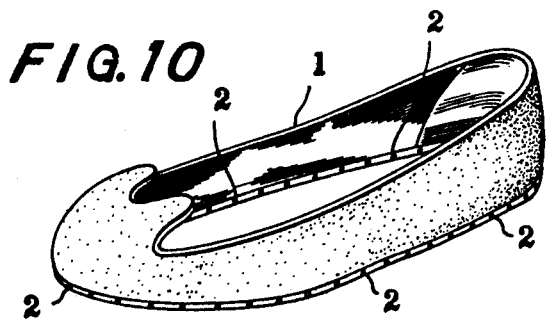
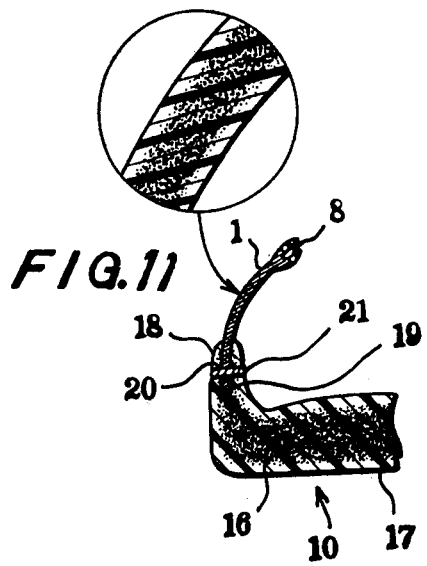
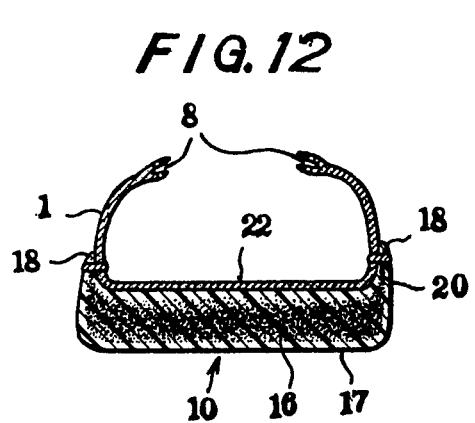
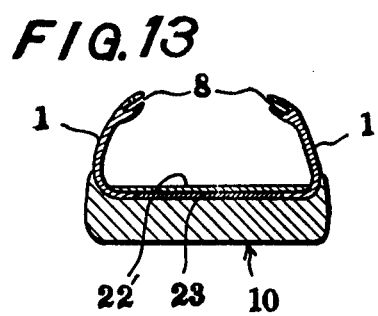
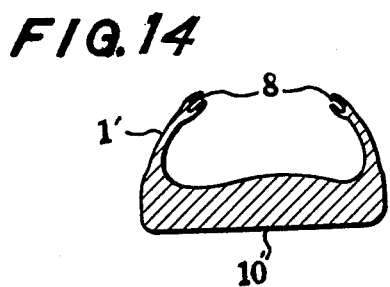

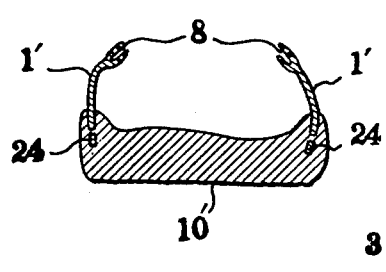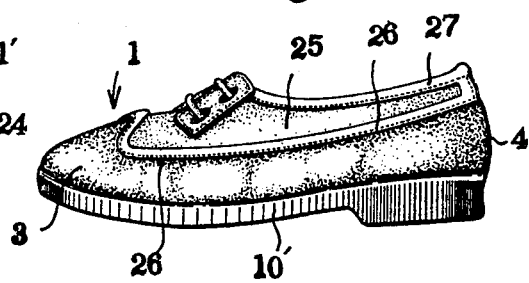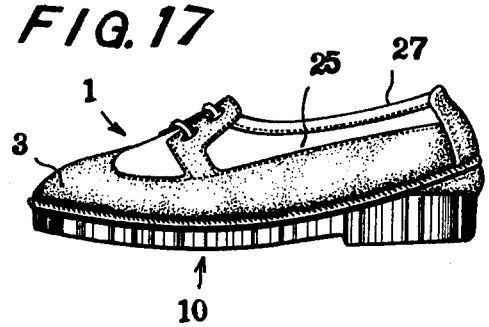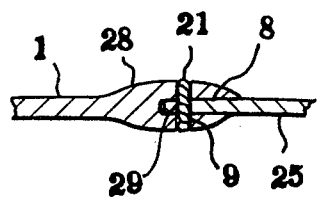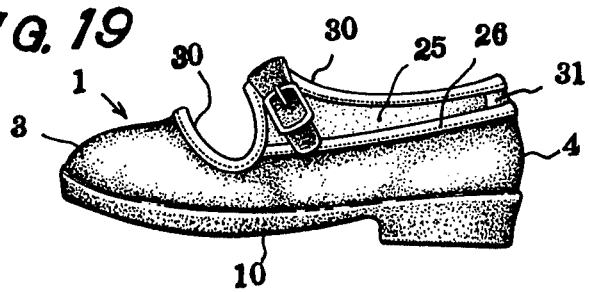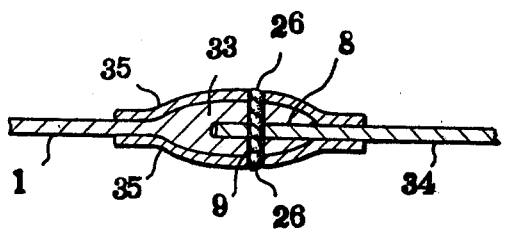

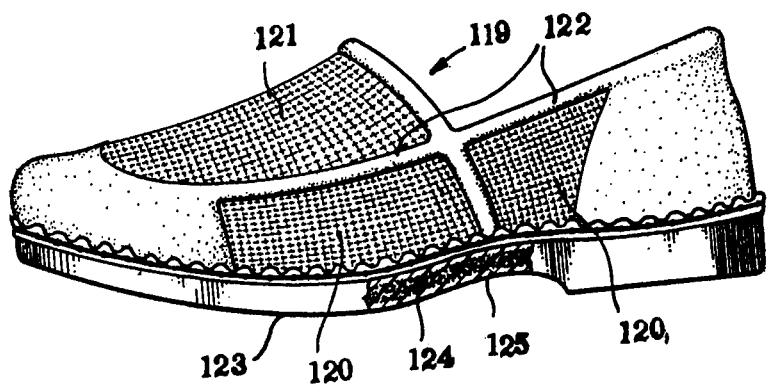
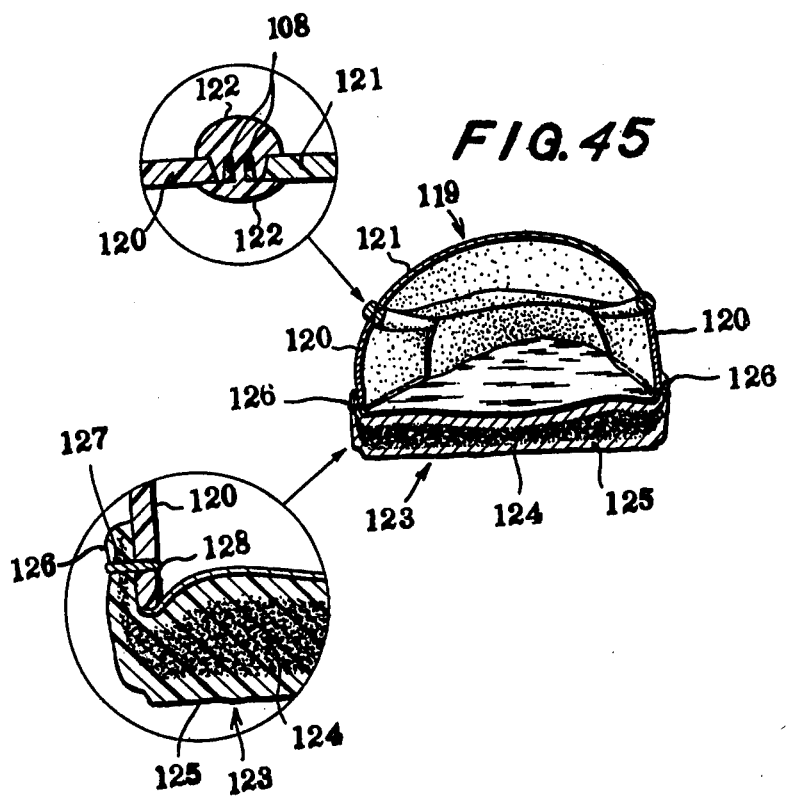

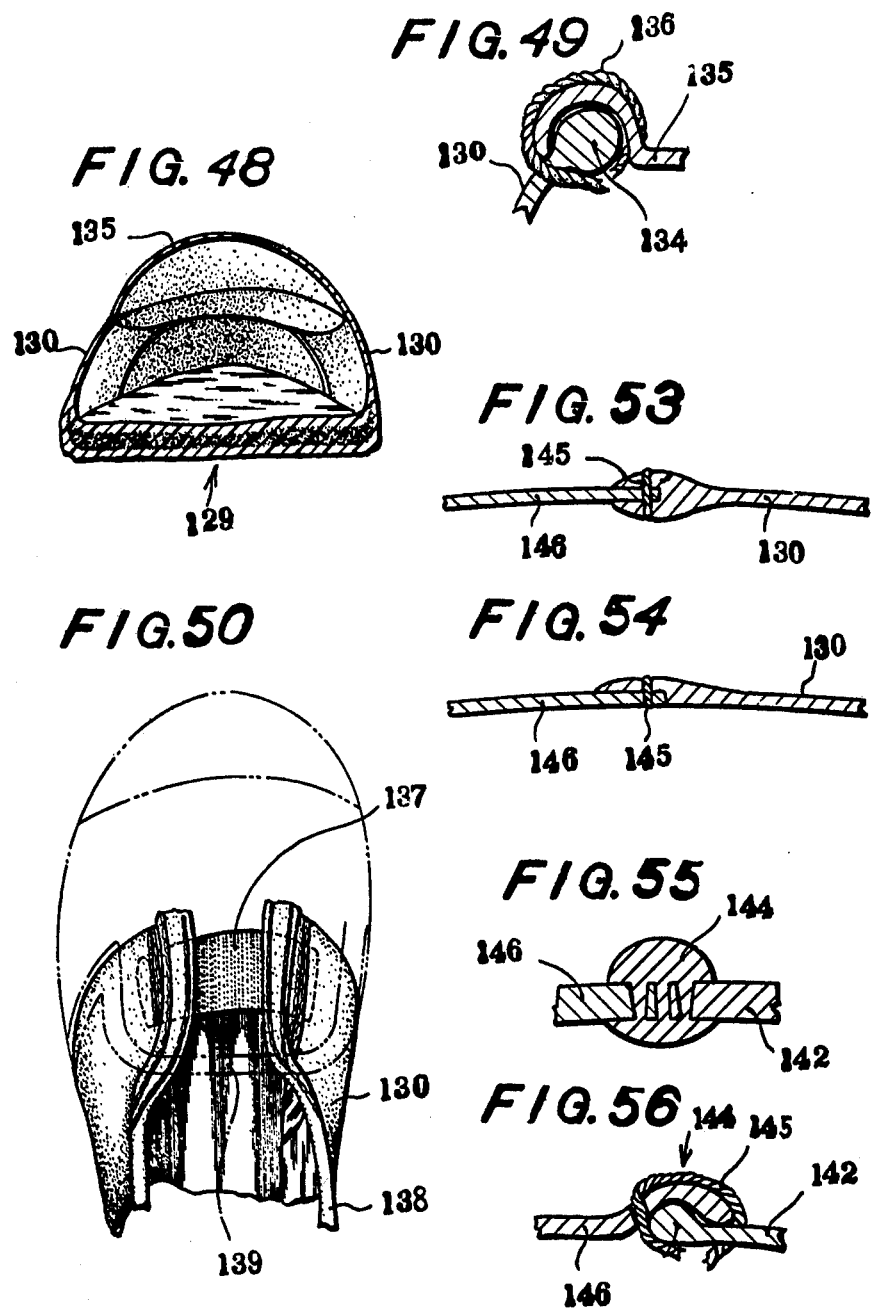

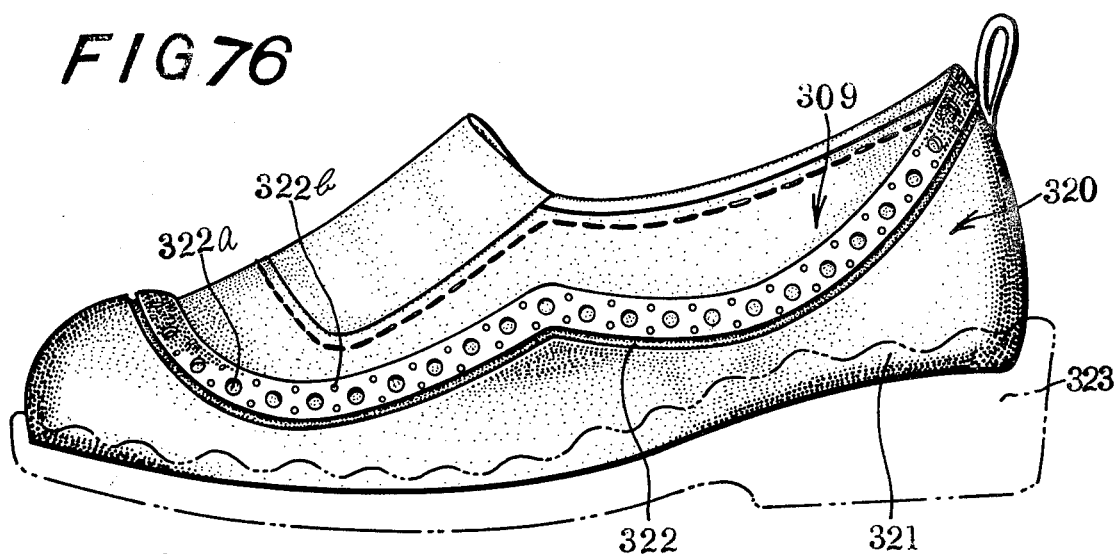
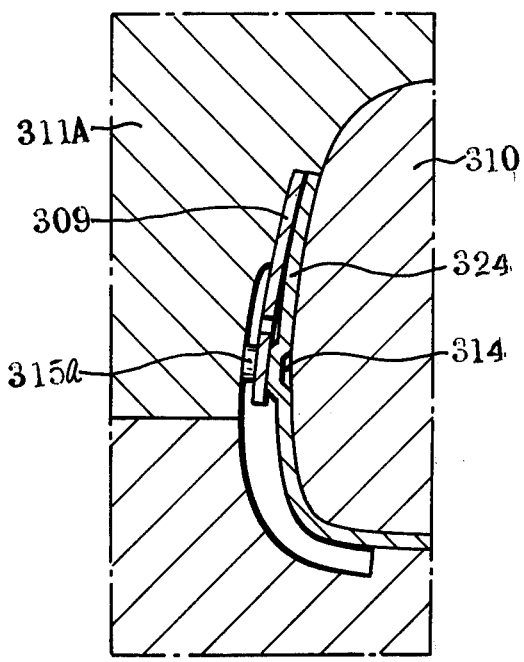
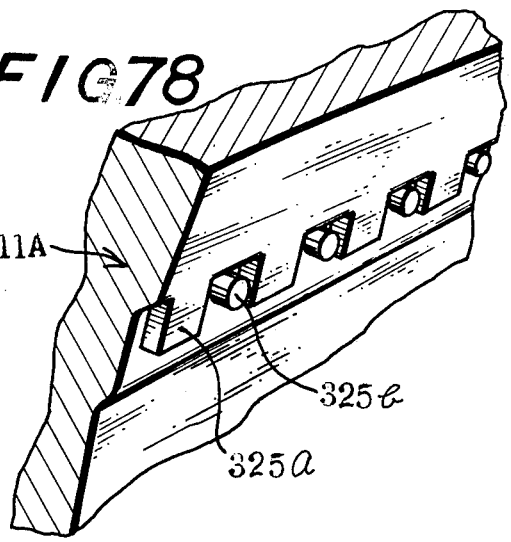
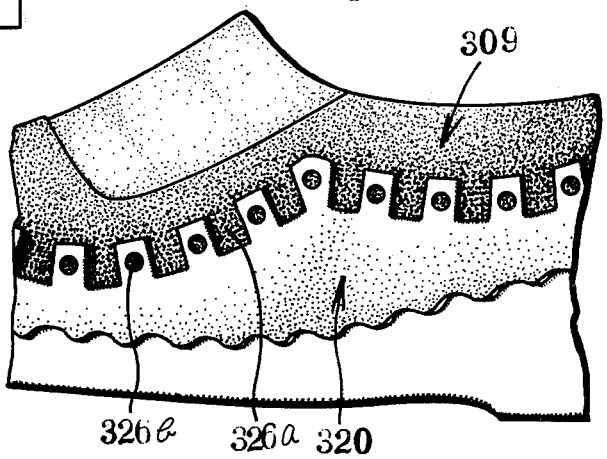

METHOD FOR MANUFACTURING A FOOTWEAR

This application is a continuation-in-part of my prior application entitled "SHOE AND A METHOD FOR MANUFACTURING THE SAME", Ser. No. 511,243 filed Oct. 2, 1974, now U.S. Pat. No. 3,952,358 which was a continuation-in-part of Ser. No. 402,967, filed Oct. 3, 1973, now abandoned.

The present invention relates to an improved method for manufacturing a footwear and a footwear manufactured thereby.

According to conventional methods, much art, skill, labor and time have been needed for manufacturing a shoe. There have been contradictory problems of improving comfortableness to wear, retaining predetermined shape after use and variety of design versus the problem of how to economically and effectively manufacture a shoe. The inventor has been studying this subject for many years and now found the solution therefor by applying the following.

A shoe is generally considered to consist of three sections, namely a lateral side section of upper, an upper vamp section and a sole, and that difficulties in the art of three dimensional shaping, retaining the three dimensional shape, improving comfortableness to wear and manufacturing by dealing with material consist concentratedly in the part of the lateral side section of upper. Therefore, the inventor has succeeded in developing a method for manufacturing a shoe in which said shoe is generally divided into three sections, namely, an upper vamp section, a lateral side section and a sole, and at least the upper vamp section, made of natural or synthetic leather or fabric or non-woven fabric material, is connected to the lateral side section which is integrally and three-dimensionally molded of synthetic resinous material. The molding material for the lateral side section of upper has for its main ingredient a required synthetic resinous composition such as a composition including vinyl chloride resin, ethylene vinyl acetate copolymer resin, polyurethane resin or the like, but a foamed composition is preferable. Such molding material may be molded into a lateral side section of upper together with non-woven fabric. Another material may be used together with resinous material, and further, synthetic leather may be used.

The upper vamp section and the sole are connected to said lateral side section. The upper peripheral edge of the lateral side section is connected to the lower peripheral edge of the upper vamp section by manual work such as seaming or binding together.

In this case it may be so arranged that diameter of each of openings provided on the peripheral edges of the lateral side section and the upper vamp section for seaming or binding together is larger than that of a thread passing therethrough, whereby air-permeability of the shoe is obtained. This connection by seaming or binding together can provide some decorative effect on the edge portions thus connected. The lateral side section and the sole may be connected together by a known method. If desired, the two sections may be integrally formed, and an insole may be provided extending over the lower peripheral edge of the lateral side section during or after molding. Lining or backing of the lateral side section may be effected at the same time with the molding of the lateral side section by previously mounting lining or backing cloth on the mold, or after the molding of the lateral side section.

A shoe according to the present invention has the following advantages in comparison with the conventional chemical shoe.

1. Art, labor and time required can be sharply saved, and also material can be saved.

For example,

1. Pasting of leather for a lateral side section can be cut thereby saving labor therefor.

2. An inner padding cloth is unnecessary, thereby saving material and labor therefor.

3. Cutting and machine-sewing for forming an upper is unnecessary, thereby saving material and labor therefor.

4. Steps for molding and lasting a toe cap section and a counter section are unnecessary, thereby saving material, adhesive agent and labor therefor.

5. Steps for pulling and lasting, for which the most special art and skill are conventionally needed, are unnecessary, thereby saving much skilled labor and time therefor.

6. Heat-treating step for finishing is unnecessary, thereby saving labor, time and energy therefor.

7. Through all the manufacturing steps, nearly 40% of the material cost and nearly 60% of labor can be saved.

8. Wooden patterns and aluminum patterns (of prototype), which are expensive and have been indispensable in the conventional method, are unnecessary, thus affording to lower the manufacturing cost and save labor for manufacture.

2. Other advantages

1. An insole is easily mounted and fixed, by the interposition of a more or less resilient lateral side section of upper integrally molded, suitably shaped and shape-retained. Mounting of an insole may be further improved by providing fitting portions on the lower periphery of a lateral side section of upper, the periphery of a sole and a shape-retaining and connecting member of the sole.

2. Since a lateral side section is molded in a molding cavity, said section can be formed without fail into a required three dimensional shape, and formed in any variety of shapes as required, thus affording to improve the appearance and comfortableness in use. Further, because of such molding a shoe has an excellent shape-restoring property, so that a shoe of the present invention is prevented from shape-losing especially in the three-dimensional lateral side section of upper even after long use.

In this connection, in the conventional chemical shoe, a lateral side section of upper is manufactured by cutting a flat sheet into a required pattern, and then forming the same into a threedimensional shape by means of a pattern, so that shaping freely as required is difficult, and especially difficult is shape-retaining of the shoe after long use. Further, in the conventional manufacturing method, a large amount of material is lost and nearly 20% of the material is wasted in the cutting step. The method of the present invention can prevent such a loss.

3. Since a lateral side section of upper can be molded into any desired shape, a variety of shoe designs are obtained. An upper vamp section to be connected to the lateral side section is formed of natural or synthetic leather or other material. Therefore, the upper vamp section and the lateral side section of upper can be made different not only in material but in design, whereby various designs of shoe can be obtained. Further, a sole to be connected to the lateral side section can be formed of different material from that of the latter, and also variously designed. Further, air-permeability of a shoe is improved by providing a cut-away portion in the lateral side section and mounting an airpermeable or porous sheet over the cut-away portion, or by forming the upper vamp section of airpermeable or porous sheet.

As abovementioned, according to the present invention, a shoe is generally divided into three sections, namely, a lateral side section of upper, an upper vamp section and a sole. And the lateral side section, which requires the most high skill for manufacturing and is difficult to be formed into a suitable three-dimensional shape, is molded of synthetic resinous material in a molding cavity and easily and correctly formed into a required three-dimensional shape, whereby a large amount of labor, time and material can be saved. Further, an upper vamp section formed of natural or synthetic leather is connected to the lateral side section by handwork of seaming or binding together to obtain refined appearance and adjusting the shape to improve confortableness to wear, and variety of design and material of each part of a shoe to obtain a variety of designs.

Further, another object of the present invention is to provide a method for manufacturing a shoe, the lateral side section and the sole of which are integrally and three-dimensionally molded of synthetic resinous material in the mold, and a shoe manufactured thereby.

Another object of the present invention is to provde a method for manufacturing a shoe, the lateral side section of which is integrally and three-dimensionally molded of synthetic material, thereafter said lateral side section being connected to a sole manufactured separately from said lateral side section, and a shoe manufactured thereby.

Another object of the present invention is to provide a method for manufacturing a shoe, the lateral section of which is integrally and threedimensionally molded of synthetic resinous material and thereafter said lateral side section being connected to a sole by means of a shape-retaining and connecting member integrally and upwardly protruded from the sole, and a shoe manufactured thereby.

A further object of the present invention is to provide a method for manufacturing an instep cover section of a footwear, comprising placing an instep cover member preformed so as to constitute at least a part of the instep cover section e.g. an upper, a band or the like in a molding cavity of a mold adapted to clamp-mold the instep cover member in a required threedimensional shape by the close of the cavity itself and provided with a space into which synthetic resin material is flowed so as to contact with at least a part of the instep cover member, pressure-injecting molten synthetic resin material into the cavity when the instep cover member has been clamp-molded by closing the cavity, and thus connecting the synthetic resin material with the instep cover member whereby the synthetic resin material and the instep cover member form at least the main part of the three-dimensional instep cover section of a footwear.

A further object of the present invention is to provide a method for manufacturing an instep cover section of a footwear, comprising placing an instep cover member preformed so as to constitute at least a part of the instep cover section e.g. an upper, a band or the like in a molding cavity of a mold adapted to clamp-mold the instep cover member in a required three-dimensional shape by the close of the cavity itself and provided with a space into which synthetic resin material is flowed so as to contact with at least a part of the instep cover member and another space for molding a sole communicated with the said former space, pressure-injecting molten synthetic resin material into the cavity when the instep cover member has been clampmolded by closing the cavity, and thus connecting the synthetic resin material with the instep cover member whereby the synthetic resin material and the instep cover member form at least the main part of the threedimensional instep cover section of a footwear.

A further object of the present invention is to provide a method for manufacturing an instep cover section of a footwear, comprising placing an instep cover member preformed so as to constitute at least a part of the instep cover section e.g. an upper, a band or the like in a molding cavity of a mold adapted to clamp-mold the instep cover member in a required threedimensional shape by the close of the cavity itself and provided with a space for molding a connecting section, further placing another performed instep cover member to be put adjacent to the former instep cover member in the said cavity, pressure-injecting molten synthetic resin material into the cavity when the instep cover member has been clamp-molded by closing the cavity, and thus integrally connecting at least both of the adjacent instep cover members by means of the connecting member molded in the said connecting member molding space whereby at least the main part of the instep cover section of a footwear is formed.

A further object of the present invention is to provide a method for manufacturing a footwear, comprising placing an instep cover member preformed so as to constitute at least a part of an instep cover section e.g. an upper, a band or the like in a molding cavity of a mold adapted to clamp-mold at least a part of the instep cover section and provided with a space for molding a sole into which synthetic resin material is injected, pressure-injecting molten synthetic resin material into the molding cavity when at least a part of the instep cover section is clamp-molded by closing the mold and thus connecting the synthetic resin material with at least a part of the said instep cover section whereby the instep cover section and the sole are integrally formed.

A further object of the present invention is to provide a method for manufacturing a footwear comprising placing an instep cover member preformed so as to constitute at least a part of the instep cover section e.g. an upper, a band or the like in a molding cavity of a mold adapted to clamp-mold the instep cover member in a required three-dimensional shape by the close of the cavity itself and provided with a space for molding a connecting member and another space for molding a sole communicated with the former space, further placing another preformed instep cover member to be put adjacent to the former instep cover member in the said cavity, pressure-injecting molten synthetic resin material into the cavity when the instep cover member has been clamp-molded by closing the cavity, and thus integrally connecting at least both of the adjacent instep cover members together by means of the connecting member molded in the connecting member molding space, the said connecting member being integral with the sole molded in the sole molding space whereby at least the main part of the instep cover section and the sole are integrally formed.

Another object of the present invention is to provide a method for manufacturing a shoe, two or more parts of the lateral side section of which are connected to each other or one another by means of a shape-retaining and connecting member molded of synthetic resinous material, and a shoe manufactured thereby.

Another object of the present invention is to further provide a method for manufacturing a shoe, the lateral side section of which includes a part or the whole of an upper vamp section, and a shoe manufactured thereby.

A further object of the present invention is to provide a method for manufacturing a shoe, the lateral side section and/or the upper vamp section of which are provided with a cut-away section, said cut-away section being compensated with a compensating section made of a material other than that of the lateral side section, and a shoe manufactured thereby.

The present invention will become more apparent from the following detailed description of the embodiments with reference to the appended drawings.

FIG. 1 is a perspective view of a lateral side section of upper according to the present invention;

FIG. 2 is an enlarged section of expanded edge portion of a lateral side section of upper according to the present invention;

FIG. 3 is a perspective view of a modification of a lateral side section of upper according to the present invention;

FIG. 4A is a perspective view of a modification of a lateral side section of upper provided with a sole;

FIG. 4B is a perspective view of a modification of the lateral side section of FIG. 4A;

FIG. 5 is an enlarged sectional view of expanded edge of the lateral side section of FIG. 4A;

FIG. 6 is a perspective view of a modification of a lateral side section of upper according to the present invention;

FIG. 7 is an enlarged sectional view of the expanded edge of the lateral side section of FIG. 6;

FIG. 8 is a perspective view of a modification of a lateral side section of upper according to the present invention;

FIG. 9 is an enlarged section of expanded edge portion of the lateral side section of FIG. 8;

FIG. 10 is a perspective view of a further modification of a lateral side section of upper according to the present invention;

FIG. 11 is a partly cut-away sectional view showing the connection between a lateral side section of upper and a sole according to the present invention;

FIG. 12 is a sectional view of a modification of the connection of FIG. 11;

FIG. 13 is a sectional view of a further modification of the connection of FIG. 11;

FIG. 14 is a sectional view of a further modification of the connection of FIG. 11;

FIG. 15 is a sectional view of a further modification of the connection of FIG. 11;

FIG. 16 is a front view of a shoe according to the present invention;

FIG. 17 is a front view of a modification of the shoe of FIG. 16;

FIG. 18 is an enlarged sectional view of the connection between the lateral side section of upper and the upper vamp section of the shoe of FIG. 17;

FIG. 19 is a front view of a further modification of the shoe of FIG. 16;

FIG. 21 is an enlarged sectional view showing the connection between an intermediate section and a lateral side section of upper;

FIG. 44 is a front view of a modification of the shoe according to the present invention;

FIG. 45 is a sectional view of the shoe of FIG. 44;

FIG. 48 is a traverse cross-sectional view of the shoe of FIG. 46;

FIG. 49 is an enlarged sectional view of the shape-retaining and connecting member according to the present invention;

FIG. 50 is a plan diagram illustrating the connection of a connecting band according to the present invention;

FIG. 53 is a sectional view of a shape-retaining and connecting member according to the present invention;

FIG. 54 is a sectional view of a modification of the member of FIG. 53;

FIG. 55 is a sectional view of another modification of the member of FIG. 53;

FIG. 56 is a sectional view of a further modification of FIG. 53;

FIG. 76 is a side view of a shoe manufactured by means of the mold assembly of FIGS. 72 and 73;

FIG. 77 is a partly sectional view of the mold assembly with a lining mounted thereon;

FIGS. 78, 80 and 81 are part perspective views illustrating modifications of projections;

FIG. 79 is a side view of a part of a shoe manufactured by means of a mold assembly provided with projections as shown in FIG. 78;

In the drawings, the identical numerals are given to parts, members and others which are identical or similar to one another.

Figure 20:
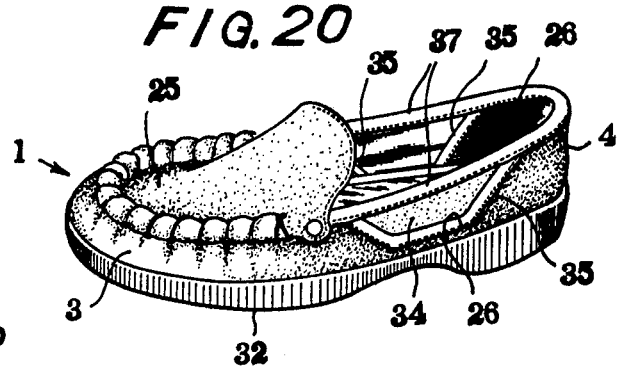
FIG. 20 is a perspective view of a further modification of the shoe of FIG. 16.

Referring to FIG. 1, a lateral side section of upper 1 is molded of synthetic resinous material into required shape in a cavity by means of a conventional mold. The lateral side section of upper may be integrally molded of an appropriate foaming resinous composition such as a polyurethane resinous composition in a molding, cavity and has a foamed inner layer and a non-foamy outer layer completely surrounding the former, the boundary of the two layers being either visible or invisible.

Examples for molding the lateral side section 1 are set forth below.

EXAMPLE 1

100 Parts of isocyanate (known under the trade name of Shoeprene 30C manufactured by Mitsui Toatsu Co., Ltd. of Japan) and 39 parts of Polyol (known under the trade name Shoeprene 10P manufactured by Mitsui Toatsu Co., Ltd.) are mixed, and if necessary, further mixed with pigments or others and then injected into a mold is a temperature of 40°–50° C. After about 6–7 minutes, the resinous material becomes hardened and thereafter the molded lateral side section 1 can be removed from the mold.

EXAMPLE 2

100 Parts of vinyl chloride, 80 parts of plasticizer (D.O.P.) 3 parts of stabilizer (known under the trade name of OF-14 manufactured by Adecaogas Co.) and 0.5 parts of foaming agent (azodicarbonamide) are mixed and injected into a metallic mold. If necessary, an additive is mixed. The mold then is at the temperature of about 35° C, while the melting point of the material is about 185° C. The molded lateral side section of upper 1 is then removed from the mold.

The lateral side section 1, as shown in FIG. 1, is provided with small openings 2 at its lower peripheral edge and small openings 2' at the front part of the upper peripheral edge thereof for connecting thereto further shoe parts. The lateral side section 1 need not if desired be provided with the small openings 2 in the lower peripheral edge as will be seen hereinafter.

In the embodiment illustrated in FIGS. 4A and 4B, the lateral side section 1 has a cut-away portion 5 located between a toe cap section 3 and a heel portion 4. Referring to FIG. 4A, the cut-away portions 5 consist of front and rear inclined edges 6, and a lower edge 7 each provided if desired with enlarged peripheral edges having a channel 8 with a series of small openings 9, passing therethrough as shown in FIG. 2 or alternatively the cross-sectional shape may be as shown in FIG. 5. The upper peripheral edges of the toe cap section 3, including a central protrusion thereof, are provided with a number of small openings 2'. A sole 10 is provided which may be molded integral with the lateral side section 1 in a molding cavity, or connected to the lateral side section 1 by conventional methods such as seaming, pulling and/or lasting. Preferably, the sole 10 comprises a foamed inner layer and a non-foamy outer layer completely surrounding said inner layer, the boundary between the two layers being visible or invisible. The sole has a construction in its cross section wherein the mean particle diameter of the bubbles is successively larger from the surface towards the center throughout the nonfoamy outer layer and the foamed inner layer. The surface of the sole 10 has such a shape that the peripheral edge portion and the shank portion is raised, while the toe portion and heel portion are recessed; said recesses communicating with each other through a generously recessed portion along the shank portion. An insole of a thin sheet may be provided to be spread over the lower edge of the lateral side section 1 during or after molding.

The lateral side section 1, in the embodiment shown in FIG. 4B, is provided with an upper bridge 11 across the cut-away portions 5 formed either integrally with the section 1 or as a separate tape member attached thereto.

Air-permeability can be obtained by making the diameter of the openings 2' larger than that of thread to be mentioned below for seaming of binding together.

In the embodiment shown in FIG. 8, the lateral side section 1 is provided with a pair of opposing protrusions 12 adapted for mounting a resilient member 13 near the central portion of the lateral side section, and a cut-away rear heel portion provided by vertical edges 14 and one horizontal edge 15. The cut-away portions shown in FIG. 6 and FIG. 8 have an enlarged marginal edge provided with a channel 8 and a series of small openings 9 as shown in FIGS. 2 and 7 or alternatively an edge as shown in FIGS. 5 and 9.

The embodiment shown in FIG. 10 is substantially the same with that of FIG. 1 with the connection between the lateral side section 1 and a sole being effected as described hereinafter. A sole 10 (shown in FIG. 11) is integrally molded of a foaming resinous composition such as polyurethane resin composition in a molding cavity, and comprises a foamed inner layer 16 and a non-foamy outer layer 17 completely surrounding said inner layer; the boundary between said two layers being visible or invisible. The sole has such a construction in its cross section that the mean particle diameter of the bubbles is successively larger from the surface towards the center through the nonfoamy outer layer and the foamed inner layer. The surface of the sole is such that the peripheral edge portion and shank portion is raised, while the toe cap section and the heel section are recessed, said recesses of the heel portion and the toe portion communicating with each other through a generously recessed portion along the shank portion.

A shape-retaining and connecting member 18 is integrally formed with the sole 10 and projects upwardly throughout the peripheral edge thereof. The shape-retaining and connecting member 18 is provided with a recess 19 for receiving the lower peripheral edge of the lateral side section 1. By aligning each one of small openings 2 provided on the peripheral edge portion with each one of small openings 20 provided on the connecting member 18, the member 18 and the peripheral edge portion are seamed or bound together with a thread 21.

In the embodiment shown in FIG. 12 the shape-retaining and connecting member 18 has a single outer peripheral lip provided with a number of small openings 20 in which case the lower peripheral edge of a lateral side section of upper 1 e.g. of FIG. 1 is provided with an insole 22 which is either a separate member or integrally formed therewith. After conventionally connecting or binding the insole onto the surface of the sole 10 by seaming or adhesive agent, the lower peripheral edge of the lateral side section 1 is disposed in contact with the inside of the connecting member 18, and each small opening 2 is aligned with each small opening 20 of the connecting member of the sole, and then the connecting member and the peripheral portion are seamed or bound together with a thread or adhesive agent.

In the embodiment shown in FIG. 13, the lower peripheral edge of the lateral side section 1, e.g. of FIG. 3, is inwardly folded, and the folded edge is adhered to the sole 10 with an adhesive agent, and further, an insole 22' is mounted and if necessary a filling material 23 is provided. In such instance the sole 10 need not be provided with openings 20 about the periphery thereof.

The embodiment in FIG. 14 illustrates a lateral side section 1' and a sole 10' integrally molded and which may be done in a conventional molding cavity.

FIG. 15 illustrates an example of the present invention wherein the lateral side section 1 is molded simultaneously with a sole 10'; the lower peripheral edge of lateral side section 1 being embedded and thereby connected to the sole adjacent the peripheral edge thereof. It is preferable particularly where the resins forming part 1 and sole 10' are of low intersolubility, the lower peripheral edge of the lateral side section 1 be provided with a band 24 or a number of openings for ensuring embedded interconnection. The section 1 for example may be molded of a urethane composition and the sole 10' of a vinyl chloride resin composition.

Further, examples of connection of a lateral side section, a sole and an upper vamp section are described hereinafter.

In FIG. 16, a lateral side section 1, without small openings 2 shown in FIG. 1, is molded mainly of foamed polyurethane resin material having a foaming ratio of 2. On the other hand, the sole is molded mainly of vinyl chloride resin having a foaming ratio of 1.5. In molding, the lower peripheral edge of the lateral side section is embedded into the surface of the peripheral edge of the sole 10'. Said two resins are of low intersolubility with respect to each other and an opening tie 24 or a number of small openings are provided assuring a positive connection between the sole and the lower peripheral edge of lateral side section 1. An upper vamp section 25, formed of natural or synthetic leather, is connected to the upper peripheral edge of the lateral side section of upper 1. This connection is effected by having the lower peripheral edge of the upper vamp section 25 project into the channel 8 in the upper peripheral edge of the lateral side section 1 (see FIG. 18) and seamed together with a thread 29. A tape 27 may also be provided and retained by the thread at such seam and the tape may also extend around the foot opening of the shoe in the upper peripheral edge of vamp 25.

In FIG. 17, the lateral side section 1 is formed mainly of foamed polyurethane resin having an expanded ratio of 1.5 and the sole 10 is formed mainly of vinyl chloride having an expanded ratio 1.3. The sole 10 is constructed as shown in FIG. 11 and the lower peripheral edge of the lateral side section of upper projects into the channel of the shape-retaining and connecting member as shown in FIG. 11. The small openings of the shape-retaining and connecting member are disposed in correspondence with the small openings provided on the lower peripheral edge of the lateral side section respectively so that the member and the section are seamed together with a thread. An upper vamp section 25 of natural or synthetic leather is connected to the upper peripheral edge of the lateral side section 1 in a manner for example illustrated in FIG. 18, wherein small openings 9 of the enlarged portion 28 of section 1 are disposed in correspondence with the small openings 29 in the lower peripheral edge of an upper vamp section 25 and through which passes a thread 26. In this embodiment the member 1 has a pair of opposed protrusions corresponding to protrusions 12 illustrated in FIG. 8 but modified to include eyelets for a shoe lace.

In FIG. 19, a lateral side section 1 of upper, molded of foamed vinyl chloride resin having an expansion ratio 1.5 and, a sole 10, formed of material including synthetic rubber as a main ingredient are interconnected by an adhesive. An upper vamp section 25 is mounted on the lateral side section of upper 1 by the same method as shown in FIG. 18. A tape 30, provided with a number of openings, provides a finished edge and a strip 31 is provided around the heel portion. FIG. 19 illustrates a vamp 25 not joined to the toe portion providing thereby an opening therebetween.

In FIG. 20, a lateral side section 1, as illustrated in FIG. 6 is integrally molded of material including soft vinyl chloride resin as the main ingredient. A sole 32, molded of material including semirigid vinyl chloride resin as the main ingredient with nitrile rubber as a plasticizer, is connected to lateral side section 1 in a manner as shown in FIG. 13. The inclined edges 6 and the lower edge 7 of a cut-away portion 5 (see FIG. 6) have an expanded edge portion with a channel 8 as shown in FIG. 7 into which an intermediate section 34 is fitted. The intermediate section 34 is formed of a sheet of natural or synthetic fiber material (including fibric), natural or synthetic leather, vinyl chloride, polyurethane or other synthetic resinous material, or other materials. The section may be formed of an airpermeable leather or sheet, or porous sheet thereby obtaining air-permeability. The intermediate section 34 is joined to edges 6 and 7 in a manner as shown in FIG. 18 and tapes 35 provide a finished edge. There tapes however may be dispensed with if desired. The upper edge of sections 34 and the heel portion 4 are finished with a tape 35. The shoe is provided with an upper vamp 25 connected to toe cap section 3 in a manner illustrated in FIG. 22. The toe cap section has an enlarged upper edge 33' covered with a downward edge of the vamp section 25 and which are bound together with an ornamental thread 26' passing through a number of small openings 9' in the vamp and holes 9 in the lateral side section.

Figure 22:
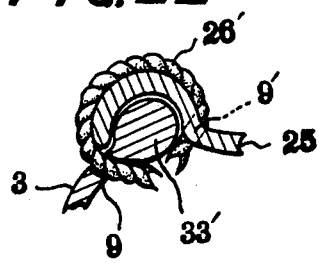
FIG. 22 is an enlarged sectional view showing the connection between the lateral side section of upper and the upper vamp section of FIG. 20.
Figure 23:
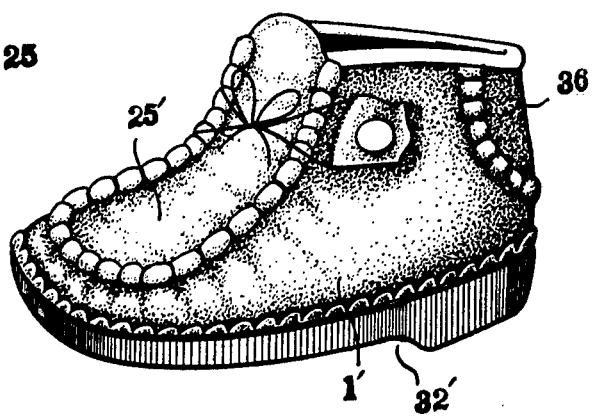
FIG. 23 is a perspective view of a further modification of the shoe of FIG. 16.

In FIG. 23, a lateral side section 1' and a sole 32' are integrally molded of foamed soft polyurethane composition in the conventional molding cavity. An upper vamp section 25' and a rear portion 36 are formed of natural or synthetic leather material and bound to the lateral side section 1' in a manner as shown in FIG. 22.

Figure 24:
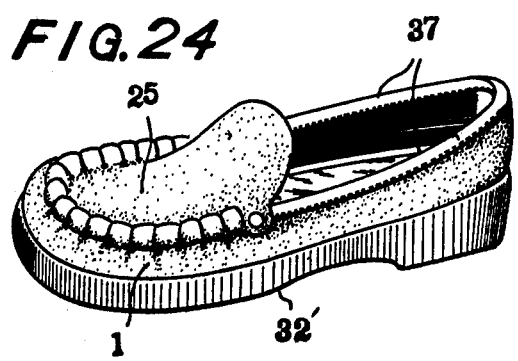
FIG. 24 is a perspective view of a further modification of the shoe of FIG. 16.

In FIG. 24, a lateral side section 1 and a sole 32' are integrally molded of foamed soft vinyl chloride resin composition in a molding cavity. An upper vamp section 25 is bound to the lateral side section in a manner as shown in FIG. 22. A tape 37 is provided around the foot opening of the shoe.

Figure 25:
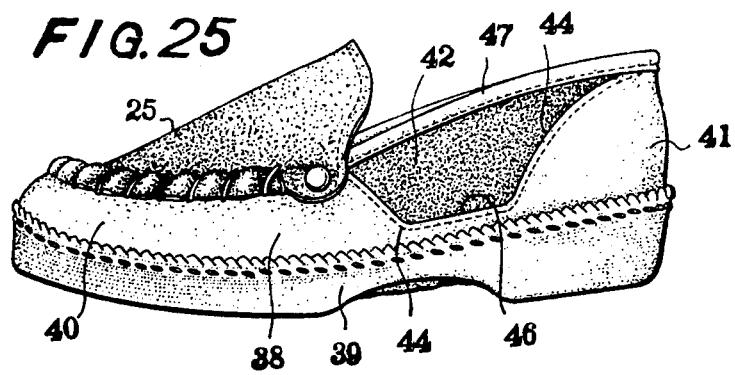
FIG. 25 is a perspective view of a further modification of the shoe of FIG. 16.
Figure 26:
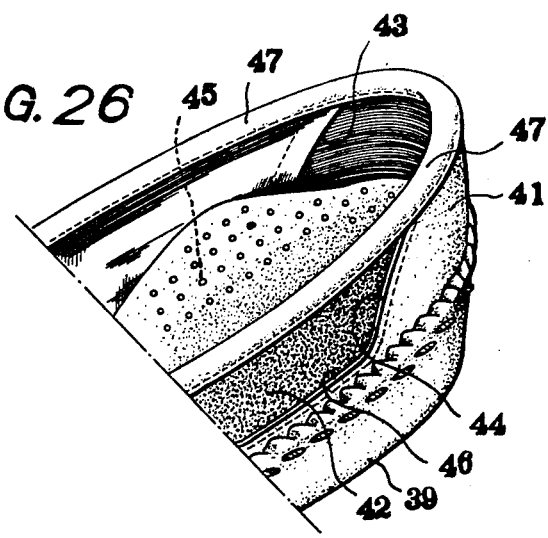
FIG. 26 is a perspective view for illustrating the heel section of the shoe of FIG. 25.

FIGS. 25 and 26 illustrate a shoe having a construction different from that shown in FIG. 20. Referring to these figures the shoe has a lateral side section 38 and a sole 39 integrally molded of foamed soft polyurethane composition or another non-foamy synthetic resinous material as suggested heretobefore or hereinafter. Between a toe cap section 40 and a counter or heel section 41, section 38 is provided with a cut-away portion having an intermediate section 42 therein. The intermediate section 42 is made of sheet or cloth of natural or synthetic fiber material (including fabric), natural or synthetic leather, vinyl chloride, polyurethane or other synthetic resinous material, or other materials. It may be formed of an airpermeable leather or sheet, or porous sheet thereby containing air permeability. The intermediate section 42 covers the cut-away portion and has inclined edges 42, 43 overlapping inclined edges 44, 44 of the cut-away portion of the section 38 and a lower edge overlapping the lower edge of the cut-away portion. The intermediate sections 38 are located in the shoe and are secured by a conventional adhesive agent and/or stitching with thread or machine sewing the overlapping portions. A tape 47 covers the uppermost edges of the section 42 and section 38 and is firmly connected thereto by a conventional adhesive agent and/or stitching with thread or machine sewing.

Figure 27:
FIG. 27 is an enlarged sectional view of a cushioning portion according to the present invention.

In the embodiments shown in the drawings, a cushioning section 48, as shown in FIG. 27, may be provided in the portion, with which the foot contacts, of the lateral side section and/or the upper vamp section. The cushioning section 48 is formed in an extended portion of the lateral side section or the upper vamp section, rolled over to provide a space 58 and which space is filled with a soft filling 49 such as polyurethane, vinyl chloride or other highly foamed material.

Figure 67:
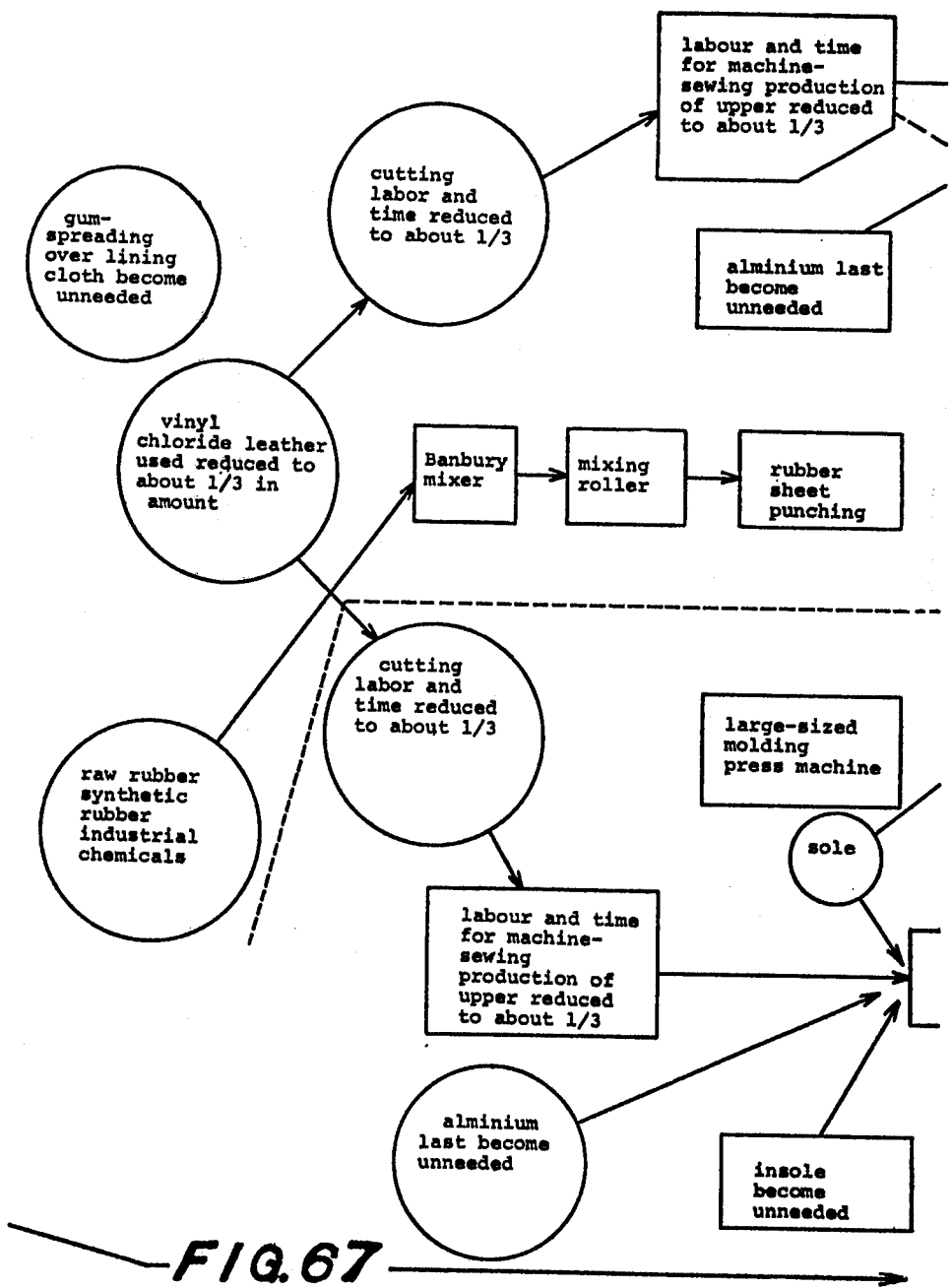
FIG. 67 is a diagram for summarizing reduction advantages effected by steps of the method according to the present invention in comparison with those of the conventional method.
Figure 67:
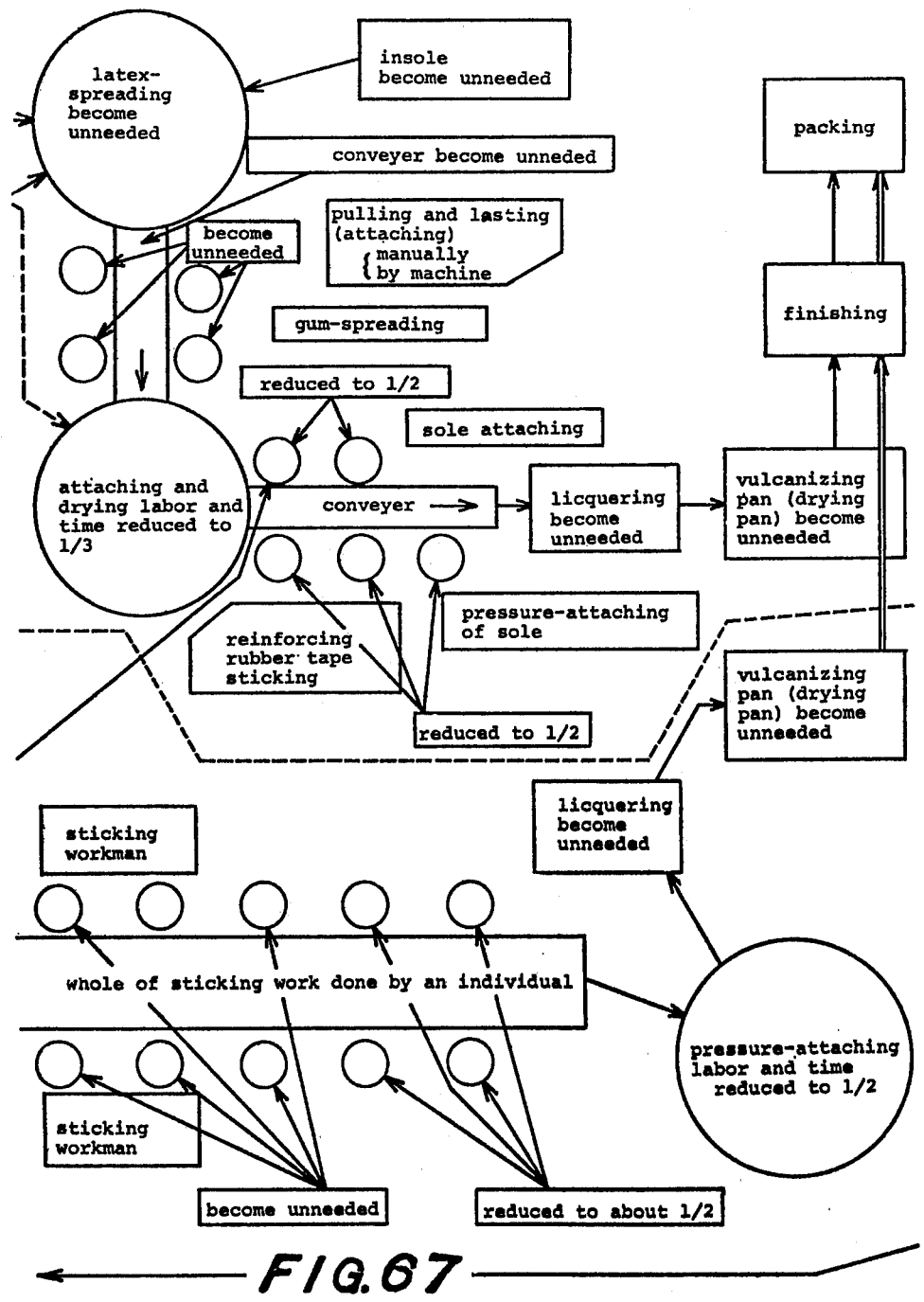

As abovementioned, according to the present invention the lateral side section of upper can be easily and accurately molded into any desired shape, which can be retained for a long time. Further, sections to be specially processed such as a toe cap section and a counter section can be manufactured without using any core mold for obtaining shape-retaining effect. And processing which needs special skills can be dispensed with. These result in saving much skill, time and material which necessary in the conventional method, as illustrated in FIG. 67 demonstrating the advantages according to the present invention how to reduce time, labor and material in comparison with those indispensable for producing the conventional type shoes by the known method. Further, many other advantages as abovementioned can be effected according to the present invention.

An upper, which is the most difficult section to be manufactured in the conventional method, can be easily obtained in a desired shape according to the present invention. Besides, a variety of shoe designs can be obtained for example by forming a lateral side section of upper of synthetic resin, and an upper vamp section of natural or synthetic leather thereby making the two sections different from each other in material and design.

One of the main advantages of the present invention results from separating a lateral side section of upper from a shoe and also in molding such section with a synthetic resin material. Using conventional methods, the lateral side section of upper is most difficult to manufacture and especially by mass-production, requiring much labor, time and skill. On the contrary, according to the present invention, the section is easily obtained as abovementioned. Furthermore, at least an upper vamp section is formed by natural or synthetic leather, and the upper vamp section is connected to the lateral side section by seaming or binding together, thereby obtaining an additional advantage in that designs of each section of a shoe are varied without losing the quality of a conventional shoe.

Figure 28:
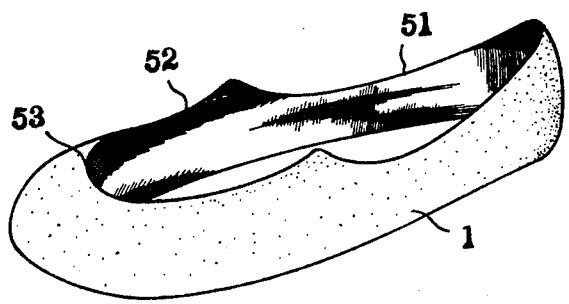
FIG. 28 is a perspective view of a lateral side section according to the present invention.

Referring to FIG. 28, a lateral side section 1 is molded into a required three-dimensional shape of synthetic resin material in a conventional molding cavity. In the drawing, shown are an entrance 51, the upper peripheral edge 52 of a lateral side section 1 and the front peripheral edge 53 of said upper peripheral edge. A thin bottom sheet may be mounted extending over the lower peripheral edge of the lateral side section. The lateral side section is integrally molded of foamy resin compound such as polyurethane resin compound in a molding cavity. The lateral side section comprises a foamed inner layer and a non-foamed outer layer thoroughly surrounding said inner layer, the boundary of the two layers may be visible or invisible. Further, the lateral side section has such a construction in section that the mean diameter of bubbles are gradually increased in size from the outer surface to the center.

Examples of molding are set forth below.

EXAMPLE 3

100 Parts of isocyanate (known under the trade name of Shoeprene 30C manufactured by Mitsui Tohatsu Co., Ltd.) and 35 parts of polyol (known under the trade name of Shoeprene 10P of Mitsui Tohatsu Co., Ltd.) are mixed and pigments and other additives added thereto as desired. The mixture is injected into a metallic mold at a temperature of 40°–50° C 6–7 Minutes after the injection the resinous material is completely hardened, and then removed from the mold.

EXAMPLE 4

100 Parts of vinyl chloride, 80 parts of plasticizer (O.O.P.), 3 parts of stabilizer (known under the trade name of OF - 14 by Adecaogas Co. Ltd.) and 0.5 parts of foaming agent (azodicarbonamido) are mixed and injected into a metallic mold. Additives may be added if desired. The mold is at a temperature of about 35° C, while the melting point of the mixture is about 185° C. The molded lateral side section of upper is then removed from the mold.

Figure 29:
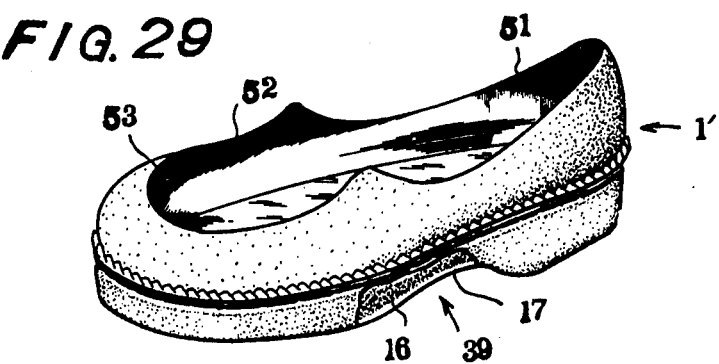
FIG. 29 is a perspective view of a lateral side section of upper according to the present invention provided with a sole.

As shown in FIG. 29, a sole 39 may be molded integrally with the lateral side section 1 in a molding cavity. However, a separately formed sole may be connected to the lateral side section by methods disclosed hereinbefore. Preferably, the sole comprises a foamed inner layer and a non-foamed outer layer thoroughly surrounding said inner layer, the boundary between the two layers being visible or invisible.

In the sole surface, the peripheral edge is raised, and the shank portion is also raised, while the toe portion and the heel portion are recessed respectively from said raised portion of the peripheral edge, said recesses communicating with each other through a generously recessed portion along the shank portion. A thin bottom sheet may be provided, spreading over the lower peripheral edge of the lateral side section 1 during or after molding. A lateral side section formed of material other than synthetic resin can be treated similarly according to the present invention.

The connection between the lateral side section of upper and the sole is as follows.

The sole 39 (of FIG. 29) is molded of polyurethane resin composition or other suitable foamed resin composition in a molding cavity, and comprises a foamed inner layer 16 and a non-foamed outer layer 17 thoroughly surrounding said inner layer. The lateral side section 1 may be molded integrally with the sole 39 in a molding cavity or may be connected to the sole 39 in various manners disclosed hereinbefore.

Further, examples of material for the lateral side section of upper, the sole and upper vamp section are set forth below.

The main ingredient of a lateral side section may be foamed polyurethane resin having an expansion ratio of 2.0, and that of a sole a vinyl chloride resin having an expansion ratio of 1.5, and the upper vamp section a natural or synthetic resin.

Alternatively, the main ingredient of the lateral side section may be foamed polyurethane resin having an expansion ratio of 1.5, the sole a vinyl chloride resin having an expansion ratio of 1.3 and the upper vamp section a natural or synthetic leather.

Further, the lateral side section may be formed of foamed vinyl chloride resin, the sole formed from material including synthetic rubber as the main ingredient and the upper vamp section being a woven or non-woven fabric.

Further, the lateral side section may be molded of material including soft vinyl chloride resin as the main ingredient and nitrile rubber as plasticizer, while the sole may be molded of material including semi-rigid vinyl chloride as the main ingredient, and the upper vamp section formed of natural or synthetic leather.

A shape-retaining and connecting member protrudes upwardly from the peripheral edge of the sole 39 throughout the peripheral edge. The lower peripheral edge of the lateral side section 1 fits into the inner surface of the shape-retaining and connecting member of the sole 39 with a number of small openings disposed in correspondence with small openings in the connecting member. The connecting member and the peripheral edge of the lateral side section are seamed or bound together with a thread.

Shown in FIGS. 30 to 33, is a modified shape-retaining and connecting member and which is formed of synthetic resinous material. Examples of the same are as follows.

EXAMPLE 5

One end of a shape-retaining and connecting member 54 formed of soft polyurethane resin material is integrally connected by fusion or by the other conventional adhering, stitching, or machine sewing, to the front portion 55 of the peripheral edge of an upper vamp section 56 at the time of molding or at another time. The front portion 55 (in FIG. 30) fits into a channel 57 of a fitting band branch 58 of the member 54. An extended portion 59 (FIGS. 30 and 31) of the upper peripheral edge of a lateral side section 1 fits into another channel 60 of a band 61 which is substantially an upside-down-U-shaped in section portion of the member 54. A thread 62 passes through openings seaming or binding together the connecting member 54, lateral side section 1 and upper vamp 56.

The vamp 56 is further connected to member 54 by a thread 64 passing through a number of openings in the fitting band branch 58 and openings in the vamp aligned therewith.

Figure 30:
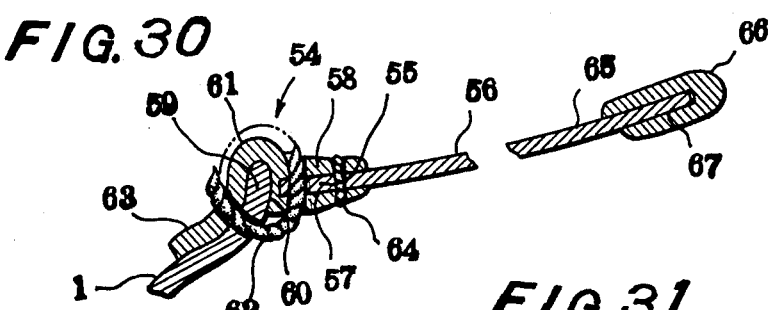
FIG. 30 is an enlarged sectional view of a shape-retaining and connecting member according to the present invention.

As shown particularly in FIG. 30, the portion 65 of the peripheral edge of the upper vamp section 56 is connected by fusion either at the same time as molding of the resin material or during a separate molding operation to a rear edge portion 66 having a channel 67 into which the rear edge 65 of the upper vamp section fits.

The abovementioned soft polyurethane resin material is a mixture of 100 parts by weight of isocyanate (sold under the trade name of SHOEPRENE 300C by Mitsui Tohatsu Co., Ltd.) and 39 parts by weight of polyol (sold under the trade name of Shoeprene 10P by Mitsui Tohatsu Co., Ltd.) and has expansion rate of 2 and strong adhesiveness to the upper vamp section.

EXAMPLE 6

The material of the said shape-retaining and connecting member is soft vinyl chloride resin composition. The composition is a mixture of 100 parts by weight of vinyl chloride resin, 75 parts by weight of plasticizer (DOP), 3 parts by weight of stabilizer (sold under the trade name of OF-14 by Atekaahsas) and 1 part by weight of foaming agent (azodicarbonamide). The molded product of the composition has an expansion rate of 1.8.

When the shape-retaining and connecting member made of vinyl chloride resin composition is molded and fixed to the upper vamp section by means of the conventional injection molding thereof, the fixing (binding) power thereof may not be as firm as desired and so some stitching or machine sewing may be necessary. However channels as shown in FIG. 30 generally assist the binding to an extent that stitching normally is not required.

EXAMPLE 7

Figure 31:
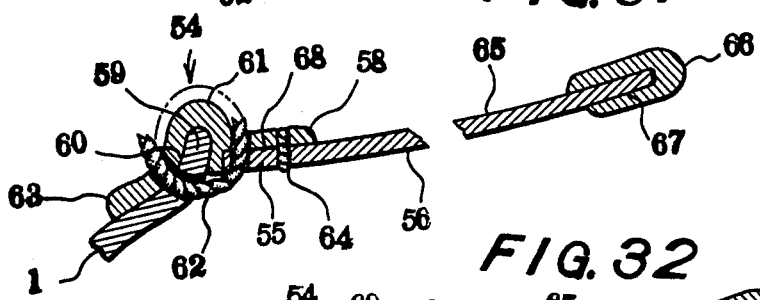
FIG. 31 is an enlarged sectional view of a modification of the shape-retaining and connecting member according to the present invention.

The construction as shown in FIG. 31 is substantially the same as that in FIG. 30 except the fitting band branch 58 is not provided with the channel 57 but instead a stepped portion 68.

EXAMPLE 8

Figure 32:
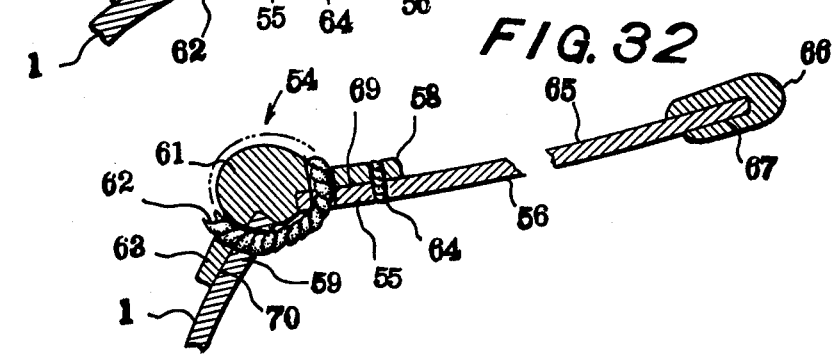
FIG. 32 is an enlarged sectional view of a further modification of the shape-retaining and connecting member according to the present invention.

In FIG. 32, the shape-retaining and connecting member 54 consists of the fitting band 61 having flange 63 extended downwardly and the band branch 58 extending generally horizontal. The band branch 58 has a stepped portion 69 for receiving the front portion 55 of the section 56 and the flange 63 also has a stepped portion 70 for receiving the extended portion 59 of the upper peripheral edge of the section 1.

EXAMPLE 9

Figure 33:
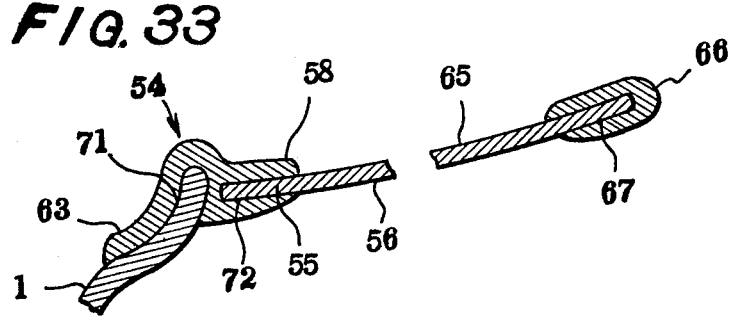
FIG. 33 is a further modification of the shape-retaining and connecting member according to the present invention.

In FIG. 33, the shape-retaining and connecting kmember 54 consists of the flange 63 and band branch 58, provided respectively with channels 71 and 72. The member 54 is preferably integrally molded with the member 1 and the upper vamp section 56 by means of the method previously described for example with reference to FIG. 30. However the member 54 may be separately molded of material as heretobefore or hereinafter mentioned and thereafter connnected to member 1 and section 56 by means of stitching, machine sewing or the like.

EXAMPLE 10

When the member 54 is molded in the mold according to the method mentioned in FIGS. 30 to 32, the front portion of the upper vamp section and the upper peripheral edge of the lateral side section are molded integrally with the member 54 by means of the following steps. The front portion of the upper vamp section and the upper peripheral edge of the lateral side section are placed in the cavity for molding the shape-retaining and connecting member and while supported the mold is closed and then semi-molten material as mentioned in FIG. 30 or heretobefore is injected into the cavity, whereby the shaperetaining and connecting member is molded and bonded integrally with the front portion of the lateral side section and the upper peripheral edge of the upper vamp section. If desired, the sole 39 may be molded together with the lateral side section, the upper vamp section and the shape-retaining and connecting member.

Figure 34:
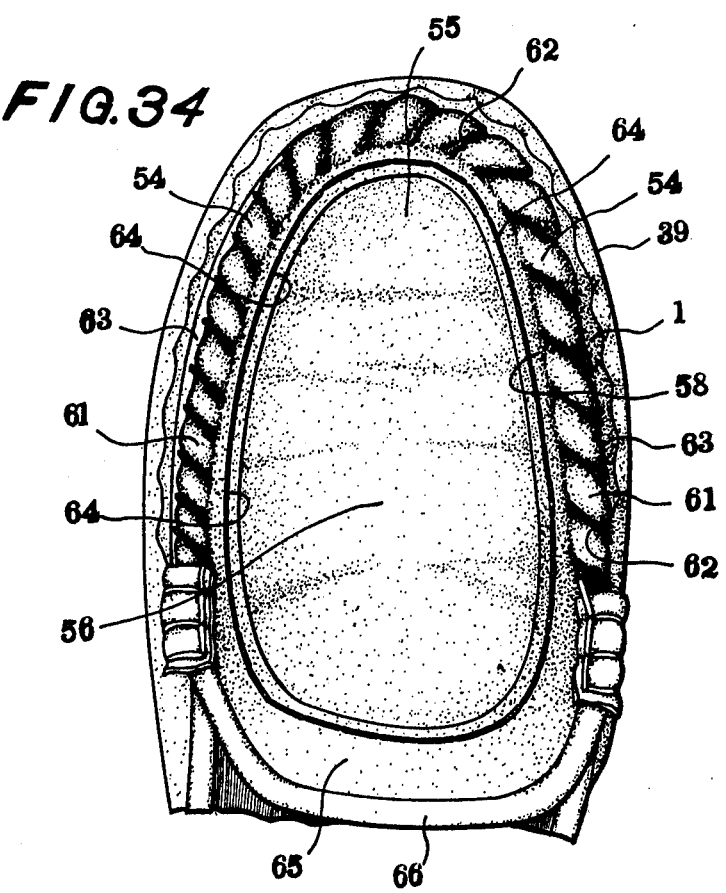
FIG. 34 is a plan view of an upper vamp section according to the present invention.

FIG. 34 is a plan view of a shoe having the construction as shown and described with reference to FIG. 30. As explained heretobefore, the lateral side section according to the present invention is easily and accurately molded into any required form and shape, and its shape-retaining and durability are quite excellent for many years. The steps of molding and lasting a toe cap section and a counter section, and steps for pulling and lasting for which the most special art and skill were absolutely required for the conventional shoes are avoided thus saving labor, time and material. The upper vamp section may be made of natural or synthetic leather and connected to the lateral side section and the sole made of synthetic resinous material permitting many various designs.

The lateral side section 1 may be formed as follows.

A conventional needle-punching step is applied to a non-woven fabric and then the punched fabric is dipped into a bath of soft polyurethane solution. Thereafter the fabric thus treated is introduced into a conventional mold and heated therein, whereby a lateral side section provided with a three-dimensional figure is easily obtained. Shoes of various design described may be made using such lateral side section.

The shape-retaining and connecting member 54 can effect a three-demensional formation of the shoe in which case the lateral side need not be dimensionally molded. If desired a further shape-retaining and connecting member such as that designated 18 in FIG. 11 may be used in a shoe in combination with member 54 shown in FIG. 30.

The main object of the present invention of having a three-dimensional lateral side section has been described in detail heretofore as well as the construction of the lateral side section, together with numerous variations in the construction of a shoe.

A further object of the present invention is to present a method for producing an upper including or not including an upper vamp section and the upper produced thereby.

The subject method comprises the step of molding a shape-retaining and connecting member from a thermoplastic or thermosetting resinous material and connecting upper sections of the upper by said connecting member separately or at the same time as molding the connecting member. The connecting member may be integral with the sole and projecting therefrom. The upper and sole may be connected to each other by an adhesive agent, sewingmachine stitching or both.

Figure 35:
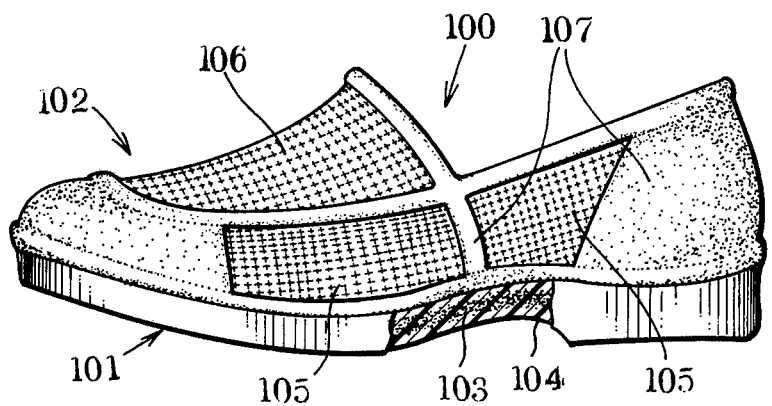
FIG. 35 is a front view of a shoe according to the present invention.
Figure 36:
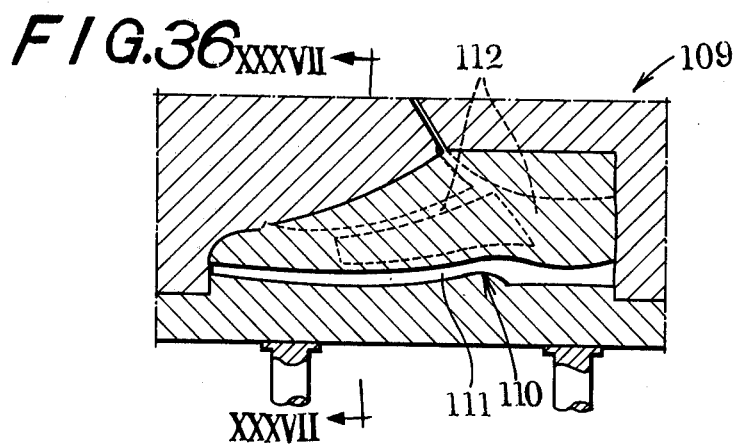
FIG. 36 is a sectional view of the main part of a mold for molding the shoe of FIG. 35.
Figure 37:
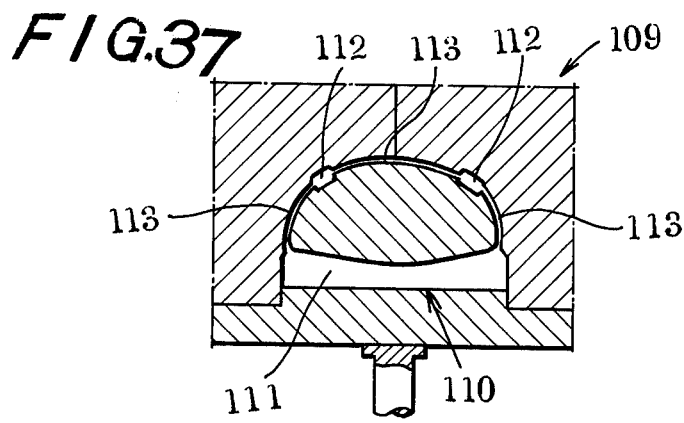
FIG. 37 is a sectional view taken along the line XXXVII — XXXVII in FIG. 36.

If FIGS. 35 to 37, there is illustrated a shoe 100 comprising a sole 101 molded of thermoplastic or thermosetting resinous material (the preferred examples are vinyl chloride resin, polyurethane resin and the like) and having an upper surface smoothly undulated substantially along the profile of the wearer's footsole, and an upper 102 composed of upper sections and a shaperetaining and connecting means for connecting the adjacent sections to one another. The sole 101 comprises a foamed inner layer 103 and a non-foamy outer layer 104 completely surrounding said foamed inner layer, the boundary between the two layers being visible or invisible. The sole may be formed of, for example, vinyl chloride, plasticizer, vesicant, stabilizer, lubricating material, coloring agent and others. The sole is constructed such that the average particle diameter of the bubbles is successively larger from the surface towards the center throughout the non-foamy outer layer and the foamed inner layer. The surface of the sole has a shape wherein the peripheral edge portion and shank is raised while the toe portion and the heel portion are recessed from said raised portion of the peripheral edge. The recesses of the heel portion and the toe portion communicate with each other through a generously recessed portion along the shank portion.

The upper comprises a toe cap section, counter section, side vamp sections 105 between the preceding two sections and an upper vamp section 106. These sections are inseparably connected to one another at the adjacent edges thereof by means of a shape-retaining and connecting member 107 protruding from the sole and formed integrally therewith into a bandlike shape during molding of the sole and having at least a minimum of flexibility and resiliency. The toe cap section and the counter sections are formed integrally with the member 107. In some cases, the connecting member 107, toe cap section and counter section are formed of compounds of vinyl chloride resin, polyurethane resin or other thermoplastic or thermosetting resinous material. The side vamp sections 105 and the upper vamp section 106 are formed of more or less air-permeable natural or synthetic fiber (including fabrics thereof) and non-woven fabric, or other materials. They may be formed of natural or synthetic leather, or porous sheet or leather, and in some cases, formed of air-permeable synthetic resin.

However, sections 105, 106 are preferably formed of other materials with a necessary minimum of air-permeability.

Figure 38:
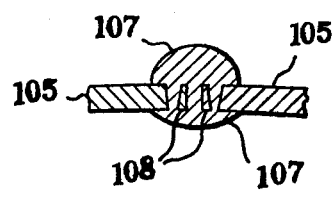
FIG. 38 is a sectional view of a shape-retaining and connecting member according to the present invention.
Figure 39:
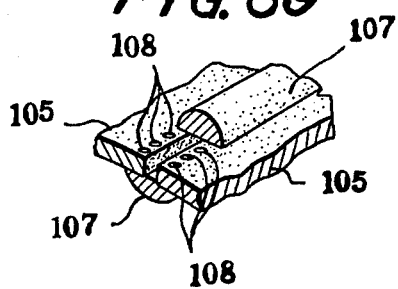
FIG. 39 is a partly cut-away perspective view of the shape-retaining and connecting member of FIG. 38.
Figure 40:
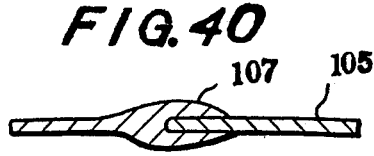
FIG. 40 is a sectional view of a modification of the member of FIG. 38.
Figure 41:
FIG. 41 is a sectional view of another modification of the member of FIG. 38.

As shown in FIGS. 38 and 39, the member 107 is formed of the same material with the sole. As understood from the molding step to be hereinafter presented, the member 107 is molded substantially I-shape in section and the same molten resinous material as used for the member 107 flows into a number of openings provided in the side vamp sections 105, and similarly into a number of openings 108 in the side vamp sections 105 or the upper vamp section 106, whereby adjacent sections, for example, the side vamp sections and the upper vamp section are inseparably connected by means of the member 107. However if the side vamp sections or the upper vamp section are formed of fibre material or others, in which molten resinous material easily flows into the meshes or eyelets of the texture, abovementioned openings 108 need not be provided. In FIGS. 40 and 41, the toe cap section and/-or counter section are formed of vinyl chloride, polyurethane or other synthetic resins. The member 107 is formed integrally with the toe cap section and connected to the side vamp sections by having an edge of the same fit into a channel as shown in FIG. 40 or lap joined as shown in FIG. 41.

The molding process in now described with reference to FIGS. 36 and 37. Illustrated therein is a mold 109 having a cavity 110 including a sole-forming chamber 111, a shape-retaining and connecting member-forming chamber 112, and spaces 113 for closely inserting the upper sections thereinto. The sole-forming chamber 111 and the member-forming chamber 112 communicate with each other to allow the flow of thermoplastic material thereinto from a supply duct. A lower section of the mold is supported by plungers actuated by suitable mechanical means (not shown) to move the same toward and away from the remaining portion of the mold. A core section also is removably supported by conventional suitable means (not shown). The upper sections of a shoe, that is, the side vamp sections 105 and the upper vamp section 106 are positioned in the spaces 113 in tight clamping relation. The size of each upper section is so defined that when positioned in the appropriate space the adjacent edges and/or edges adjacent to the sole protrude into the shape-retaining and connecting member forming chamber 112 and/or the sole-forming chamber 111. After positioning the upper sections and then closing the mold by injection molding process, vinyl chloride resin compound is injected from an injection molding apparatus (not shown) into the cavity 110 through the supply duct. The molten synthetic resin material thus injected into the cavity 110 is cooled and cured. The upper, which is formed by integrally connecting the upper sections to one another by means of the molded connecting member, and the sole integrally connected thereto provides a complete shoe. The connecting means and each of the upper sections may if desired be further connected together by machine-sewing stitching after welding.

The construction of the foamed inner layer and non-foamy outer layer of the sole also can be obtained in the abovementioned molding step, and such molding is performed according to conventional means know in the art.

In the abovementioned molding where the toe cap section, counter sections and side vamp sections are formed of vinyl chloride, polyurethane and other resinous material, only the upper vamp section is positioned into the space for inserting upper sections, and molten resin is injected into the cavity, whereby the toe cap section, side vamp sections, the counter sections, the sole and connecting member are integrally formed, and at the same time, the upper vamp section is connected thereto.

Figure 43:
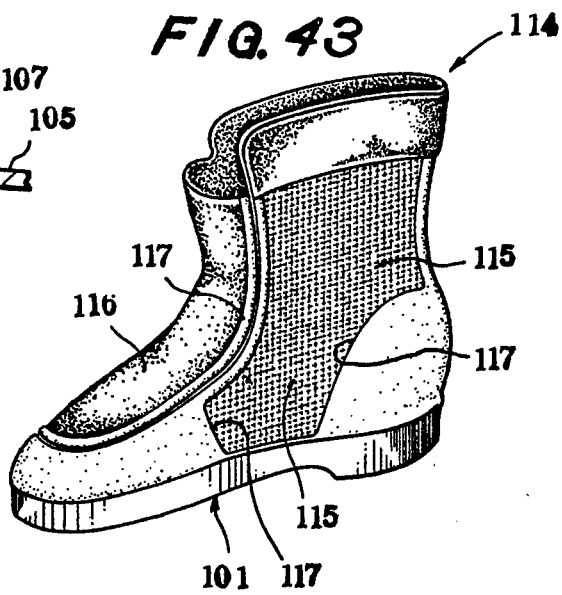
FIG. 43 is a perspective view of a half boot according to the present invention.

A boot 114 shown in FIG. 43 has a similar construction to the shoes shown in FIGS. 35 to 41. The boot 114 comprises a sole 101 of the same construction as the abovementioned sole, the upper sections 115 and 116 forming the upper, are of the same construction as the abovementioned upper sections and a shape-retaining and connecting member 117 is of the same construction as the abovementioned member 107. The construction of boot 114 and molding process thereof are the same as abovementioned.

Figure 42:
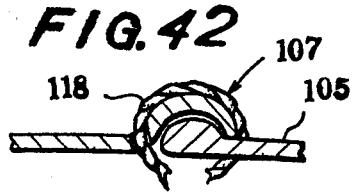
FIG. 42 is a sectional view of a further modification of the member of FIG. 38.

FIG. 42 illustrates an alternative connecting member 107 integrally formed with other sections of the shoe i.e. vamp and side section, and which sections are seamed together with a thread 118.

According to the present invention, by means of the shape-retaining and connecting member integrally protruded from the sole in molding step, the upper sections are inseparably connected to each other, and further, the upper thus formed is also inseparably connected to the sole by means of such connecting member, so that even the unskilled laborer can rapidly, easily and accurately obtain the predetermined shoes or other footwear by molding and inseparably connecting the sole, the upper sections or the upper to each other by means of such connecting member.

The sole, the upper sections and the upper thus securely connected are not disconnected from each other even after long use, and therefore, footwear of the present invention are excellent in durability.

When the shape-retaining and connecting member integrlly protrudes from the sole, it can be easily formed in a curved shape corresponding to the required shape of the upper. The upper formed by connecting the adjacent upper sections by means of said connecting member can be easily and accurately formed in a required solid shape by an ordinary and unskilled laborer. The upper thus formed in the required shape fits the wearer's instep providing a shoe that is comfortable to wear reducing fatigue of foot in prolonged use. Further, the upper of the present invention is not apt to lose shape after long use. Since said shape-retaining and connecting member is integrally extended from the sole and has at least a minimum of flexibility or resiliency, when the sole is deformed by pressure applied in use, the shape-retaining and connecting member or the upper is deformed rapidly and surely in correspondence with said deformation of the upper, and after the pressure is gone, the shape-retaining and connecting member will function well enough to compulsorily restore the original shape of the upper. If, in spite of the deformation of the sole, the upper does not change in formation in correspondence therewith, the result is the sprain of the wearer's foot in the worst case, or other disadvantages such as uncomfortableness to wear and increase of the fatigue of the foot. However, as abovementioned, the upper of the present invention changes the form well in correspondence with the deformation of the sole, thereby the shoe is comfortable to wear. Further, since the original shape of the upper is restored by the function of the connecting member, the upper is always retained in the required shape except when pressure is being applied, that is, the shoe is excellent in shape-retaining of the upper, so that according to the present invention easily obtained is a shoe comfortable to wear.

A shoe provided with a sole, a connecting member and upper sections or an upper obtained in one operation in a mold, permits manufacturing at a relatively low cost. Shoes having toe cap sections and counter sections formed of air-permeable materials have in the past been difficult to manufacture due to requiring reinforcement. In this respect, a shoe of the present invention provided with an upper vamp section and side vamp sections formed of an air-permeable and rather soft material, has air-permeable effect in side vamp sections and an upper vamp section, and fatigue-reducing effect, while maintaining the reinforcing effect in a toe cap section and counter sections.

Shoes made in accordance with the present invention may be varied in accordance with the purpose thereof, for example, for an informal shoe or a sport shoe. For example, in a shoe, a toe cap section and counter sections requiring reinforcing effect are formed of natural or synthetic leather, while side vamp sections and an upper vamp section are formed of air-permeable synthetic resin sheet or leather.

It is also possible to form the upper and sole separately, and then connect the lower peripheral edge of the upper to the sole for example (see FIGS. 44 and 45). In this case, an upper 119 comprising a toe cap section, counter sections, side vamp sections 120 and an upper vamp section 121 is formed by means of a shape-retaining and connecting member 122 in one operation in the mold in such a manner as shown in FIGS. 36 and 37. The mold in such case is not provided with a sole-forming chamber. The connection of the upper sections is the same as shown in FIGS. 38 to 42. The upper 119 may be formed into a flat shape, but in this case, it should be so molded as to become solid when mounted on the sole 123. The sole 123 shown in FIG. 44 is formed of a resin compound of a thermoplastic or thermosetting resinous material such as vinyl chloride, polyurethan or others. Said compound is formed, for example, of vinyl chloride, plasticizer, vesicant, stabilizer, lubricating material, coloring agent and others. An example of the molding of a sole using the abovementioned compound is disclosed in U.S. Pat. No. 3,058,161 issued.

The sole 123 has a surface of a generously undulated shape substantially in conformity with the profile of the user's, and comprises a foamed inner layer 124 and non-foamy outer layer 125 completely surrounding said inner layer 124. The sole 123 construction, in cross-section, has the average particle diameter of the bubbles successively larger from the surface toward the center throughout the non-foamed outer layer 125 and the foamed inner layer 124. In said sole surface, the peripheral edge and the shank portion is raised, while the toe portion and the heel portion are recessed respectively from said raised portion of the peripheral edge, said recesses of the toe portion and the heel portion communicating with each other through a generously recessed portion along the shank portion. As shown in FIG. 45, a shape-retaining and connecting member 126 protrudes upwardly and integrally from the required portion of the edge of the sole 123. The connecting member 126 is provided with a number of holes 127 for stitching. The connecting member 126 may not have the abovementioned construction but may be formed to be hollow by blow molding, extrusion molding, injection molding or their combinations.

The shoe shown in FIGS. 44 and 45 is lightweight, resilient and thereby comfortable to wear because of a foamed inner layer of the sole, and in addition, shape-losing of the sole caused by the inner construction thereof is prevented by the non-foamy outer layer.

The shape-retaining and connecting member facilitates connecting the upper 119 to the sole 123. The lower peripheral edge of the outer surface of the upper 119 is positioned along the inner peripheral surface of the connecting member which protrudes upwardly from the sole 123, and then the lower peripheral edge of the upper can be rapidly, easily and accurately connected to the connecting member by means of machine-sewing stitching, an adhesive agent or their combination, in which connecting, the upper can be disposed in a correct position in relation to the sole, thereby the required shape of the upper being obtained.

A number of pits or holes 127 for stitching in the connecting member can facilitate and ensure the machine-sewing connection between the connecting member and the lower peripheral edge of the upper by a thread 128.

A shoe after long use is apt to be deformed especially in the upper thereof. However, said upwardly protruded shape-retaining and connecting member performs shape-retaining effect, thereby the upper of the present invention being surely maintained in a required shape. Since the lower peripheral edge portion of the upper is mounted on the sole by means of the shape-retaining and connecting member, the edge portion of the upper can be cut away or reduced by the area corresponding to that of the connecting member, thereby saving the material of the upper. As the upper sections are inseparably connected to each other by means of the shape-retaining and connecting member 122, the upper 119 can be easily, rapidly and accurately obtained from the upper sections, and in addition, the required solid shape of the upper is easily obtained, and the upper shape thus obtained can be well retained.

Referring now to FIGS. 46 to 50, another embodiment is shown. The sole 129 and the lateral side section 130 of the upper are integrally formed as belowmentioned. The lateral side section 130 is here intended to include whole upper sections except an upper vamp section. The sole 129 and the lateral side section 130 are integrally molded of resin compound including vinyl chloride, polyurethane or other synthetic resin for its main ingredient and in addition other known ingredients by injection molding or other suitable molding. Inside the sold is a foamed layer 131 and outside thereof is a non-foamed layer 132 completely surrounding said foamed layer, the boundary between said two layers being visible or invisible. In the drawing, numeral 133 indicates a shape-retaining and decorative member. The lateral side section 130 can be varied in construction according to the thickness, foamed condition, foam-resisting condition or other conditions. Said lateral side section 130 may be formed of a foamed inner layer and a non-foamed outer layer, but in some cases, the inner portion is not in a foamed condition visibly or invisibly. A shape-retaining and connecting member 134 is integrally protruded from the peripheral edge of the lateral side section 130 of the upper along the upper vamp section.

On the other hand, the upper vamp section 135 may be formed of leather, cloth or sheet of natural or synthetic fibre material (including fabric), natural or synthetic leather or other materials. The upper vamp section 135 may be more or less air-permeable or not. The peripheral edge of the upper vamp section 135 along the lateral side section of the upper, or the portion extended from said peripheral edge is connected to the lateral side section 130 by means of the shape-retaining and connecting section 134, which connection is performed in such a manner as shown in FIG. 49, or by other means. Numeral 136 indicates a stitching thread.

FIG. 50 shows the portion of the lateral side section 130 of the upper upwardly adjacent to the extended portion of the upper vamp section, wherein a resilient shape-retaining band 137 formed of natural or synthetic rubber or other materials is provided in a bridge like condition between a pair of portions of lateral side section 130, said shape-retaining band 137 having the effects of retaining the shape of the lateral side section, and in addition fitting the lateral side section on the wearer's instep. Numeral 138 indicates an edge tape of an entrance while numeral 139 indicates an edge tape of the upper vamp section.

According to the present invention, since the sole and the lateral side section of the upper are, as abovementioned, integrally molded, shoes without the upper vamp section can be produced in a large scale.

Although it is possible to manufacture the shoes by mass production, numerous variations are possible by varying at least the upper vamp section which may be separately attached to the lateral side section.

Figure 46:
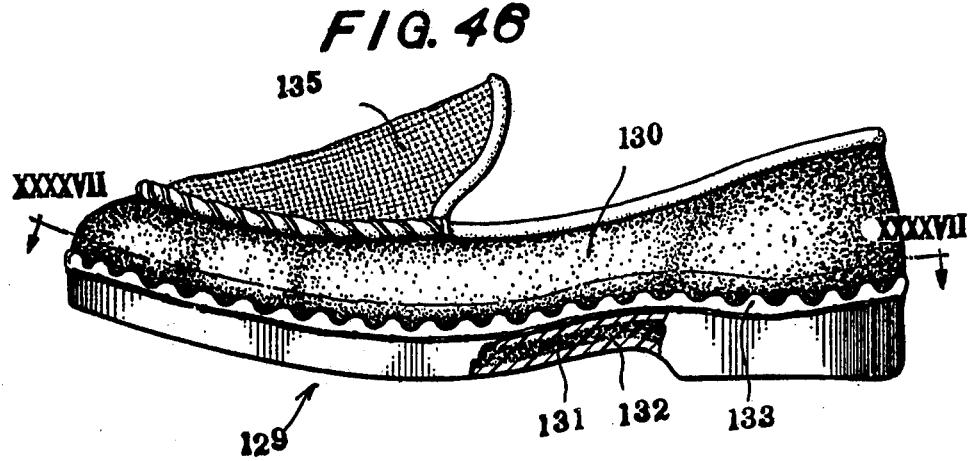
FIG. 46 is a front view of a further modification of the shoe according to the present invention.
Figure 47:
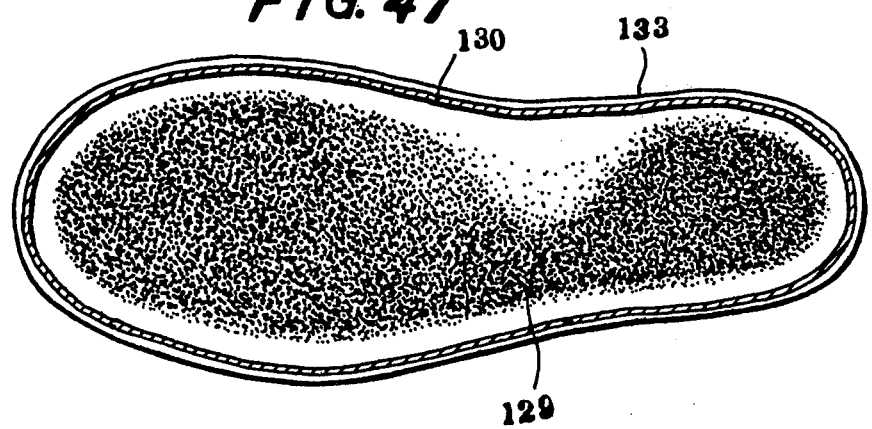
FIG. 47 is a sectional view taken along the line XXXXVII — XXXXVII of the shoe of FIG. 46.
Figure 51:
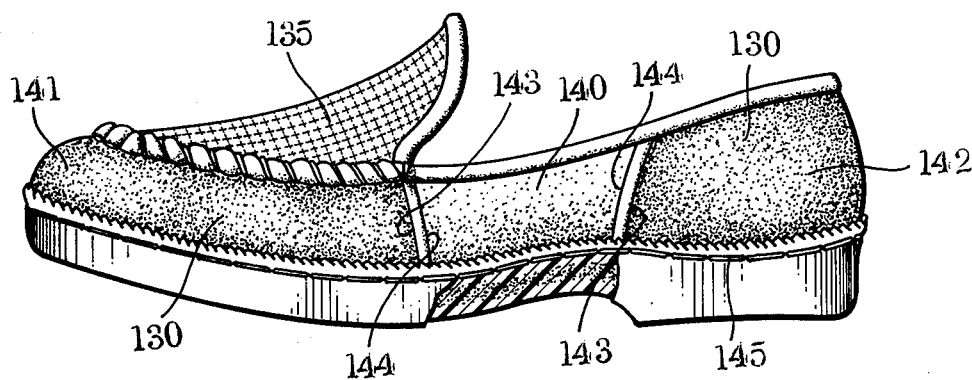
FIG. 51 is a front view of another modification of the shoe according to the present invention, wherein an intermediate section has not attached yet.

In FIG. 51 is another embodiment, the construction being the same as shown in FIGS. 46 and 47 with the following exceptions. The lateral side section 130 is not integrally formed, but is provided with cut-away portions 140 between the toe cap portion 141 and the counter portion 142. Shape-retaining and connecting members 143; 143 are provided at the edges of the lateral side section 130 adjacent said cut-away portions 140. The connecting members 143, 143 are, together with an edge tape 144, integrally molded with the lateral side section 130 when said lateral side section and the sole are integrally molded. Each of said connecting members 143, 143 has a construction as shown in any one of FIGS. 53 to 54. Numeral 145 indicates thread for machine-sewing.

Figure 52:
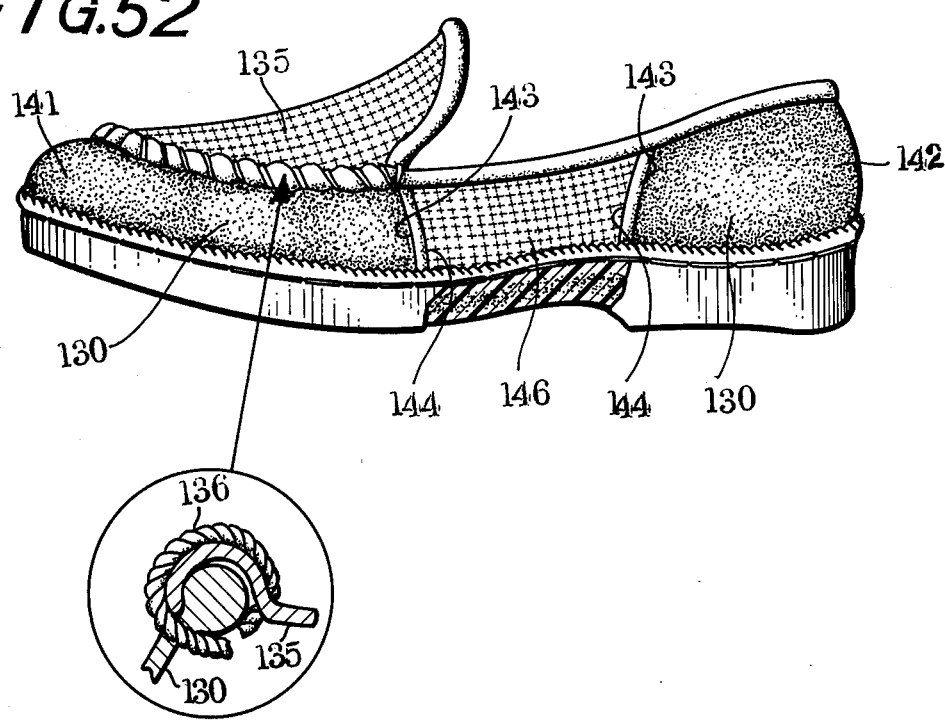
FIG. 52 is a front view of the shoe with the intermediate section being attached.

Referring to FIG. 52, shown is a further embodiment, wherein there is provided intermediate sections 146 formed of leather, cloth or sheet of natural or synthetic fiber (including fabric), natural or synthetic leather material, vinyl chloride, polyurethane or other synthetic resin material or other materials. As shown in FIGS. 53 and 54 the edges of said intermediate sections 146 adjacent to the toe cap section and the counter section respectively are fitted into groove of the connecting members 144, and if necessary, stitched by machine-sewing with thread 145. In FIGS. 55 and 56 there are shown modifications of the connections of FIGS. 53 and 54. The connecting members 144; 144 or 139 and the edge tape are integrally formed with the lateral side section 130 as abovementioned, but in some cases they are separately formed of natural or synthetic leather material, natural or synthetic fiber (including fabric thereof), or other suitable materials. The molding of the lateral side section 130 is as set forth below.

In intermediate sections are temporarily secured to or mounted on the inside of the mold within the molding chamber. Molten resin is injected into the sole-forming chamber and the lateral side section-forming chamber, whereby the sole and the lateral side section are integrally molded, and at the same time edges of the intermediate sections 146 which are temporarily secured or mounted in the positions in conformity with the cut-away portion 140 in the upper are, through or not through the fitting grooves, welded to the toe cap section or the counter section which is molded in their position of the upper. In some cases, the upper vamp section 135 is, similar to the intermediate sections, temporarily secured or mounted inside the mold in the molding chamber, and welded to the toe cap section 141 of the upper.

Shoes of the abovementioned construction have the following effects in addition to the effects belonging to the embodiment shown in FIGS. 46 to 50. First, an air-permeable effect is given to the lateral side section of the upper by making the intermediate sections air-permeable. Further, the intermediate sections give the wearer's foot relaxation from the pressure by the reinforcing toe cap section and counter section, thereby the shoes are more comfortable to wear.

Figure 57:
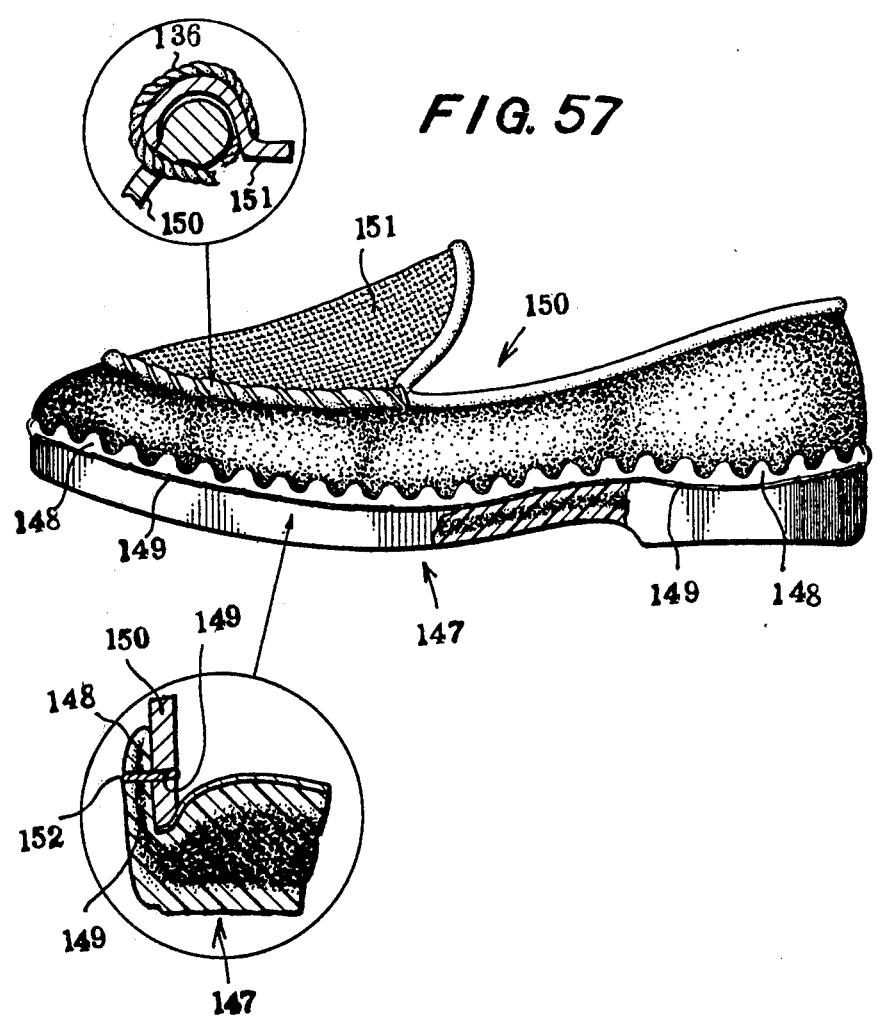
FIG. 57 is a front view of a further modification of the shoe according to the present invention.

Referring now to FIG. 57, a sole 147 is molded of a resin compound consisting of vinyl chloride, polyurethane, or other thermoplastic or other suitable synthetic resin material for its main ingredient and various known additions mixed therewith. The sole 147 is substantially in conformity with the profile of the wearer's foot-sole. An example of such soles is shown in FIG. 46 and has a foamed inner layer and a non-foamed outer layer. When the sole 147 is molded a shape-retaining and connecting member 148 is formed in an upwardly protruding shape from the peripheral edge of the sole. The shape-retaining and connecting member 148 has a number of pits 149 for stitching. And the connecting member 148 may have a foamed inner layer and a non-foamy layer similar to the sole, or may not have such a foamed layer. The lateral side section 150 of the upper has the same construction as that of the upper shown in FIGS. 46 and 47, and is provided with an upper vamp section 151. The lower edge of the lateral side section 150 of the upper is disposed along the inside edge of the connecting member 148, and is then connected to the latter by stitching with thread 152 through the pits 149. In some cases, an adhesive agent is used in said connection. And further, the lower edge of the lateral side section of the upper may be welded to the connecting member 148. Thus, the upper is connected to the sole 147.

Figure 58:
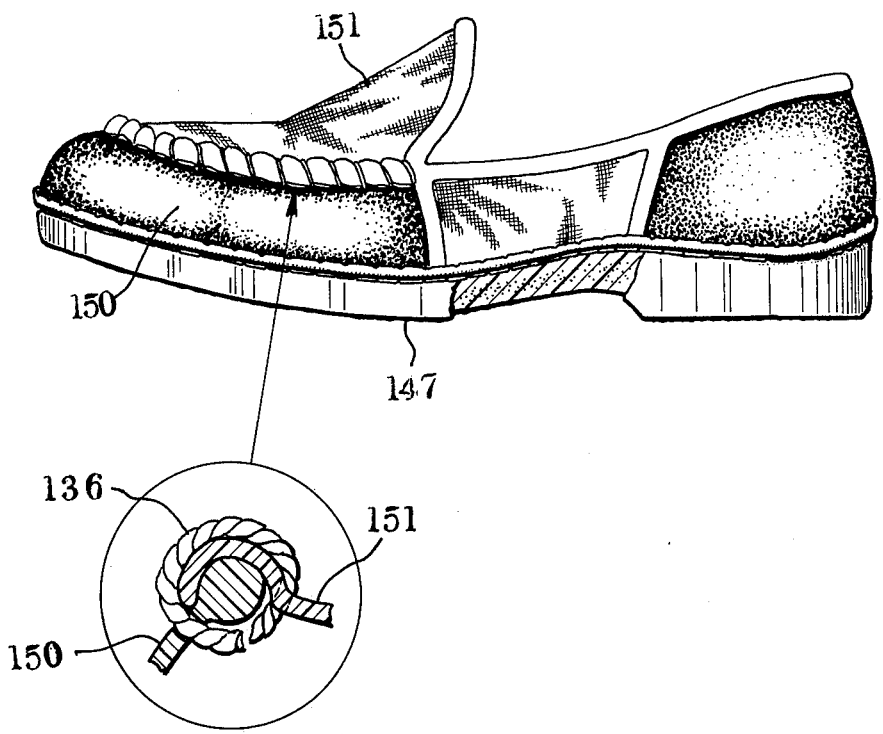
FIG. 58 is a front view of a further modification of the shoe according to the present invention.

In another shoe shown in FIG. 58, the sole 147 has the same construction as that shown in FIG. 57. The lateral side section 150 of the upper and the upper vamp section 151 may have the same construction as FIG. 57, and in such case, the connection between the lateral side section of the upper and the sole is performed in the same manner as shown in FIG. 22.

Figure 59:
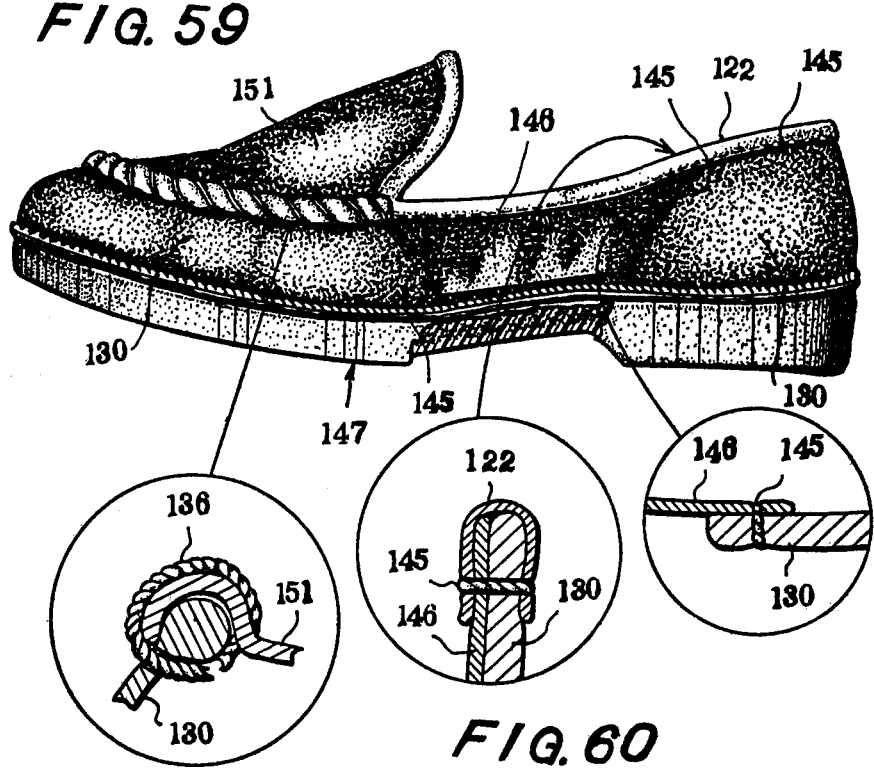
FIG. 59 is a front view of a further modification of a shoe according to the present invention.
Figure 60:
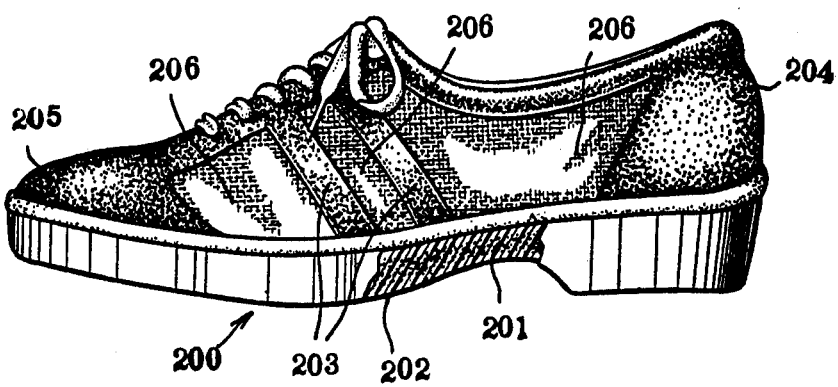
FIG. 60 is a front view of a further modification of a shoe according to the present invention.

In FIG. 59, the construction of the shoe is the same as that in FIGS. 52 or 58, except that the intermediate section 146, made of natural or synthetic leather, and the lateral side section 130 are inseparably bound by a conventional adhesive agent and hand or machine sewing thread 145 and a tape 122 covers the sections 130, 146. They are inseparably bound by a thread 145 and/or adhesive agent. Referring to FIG. 60, there is shown a sole 200 having a foamed layer 201 and a non-foamed outer layer 202. Members 204 and 205 are formed of the same material as connecting members 203. Numeral 206 indicates intermediate sections formed of air-permeable natural or synthetic fiber, or sheet of natural or synthetic leather. The connecting member 203 may be either protruded integrally from the sole or formed separately therefrom. If desired, connecting member 203 may be formed together with the section 204 and/or the section 205. The shoe is manufactured by an appropriate one of the abovementioned methods or modifications thereof. The material for said shoe is the same as used in the abovementioned methods or similar materials.

Figure 61:
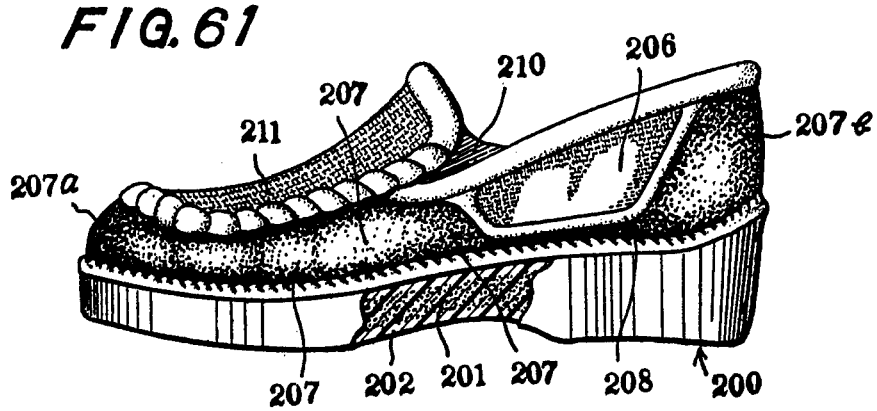
FIG. 61 is a front view of a further modification of a shoe according to the present invention.

Referring to FIG. 61, shown is a further modification of a shoe of the present invention. In the drawing, there is shown a sole 200 having a foamed layer 201 and a non-foamy outer layer 202, a connecting member 207, a toe cap section 207a, a counter section 207b, an intermediate section 206 connecting said toe cap section and said heel portion, a mounting edge 208 for mounting said intermediate section, which edge 208 may be decorated with a tape. The intermediate section 206 may be formed of air-permeable natural or synthetic fiber, or sheet of natural or synthetic leather. An elastic band 210 is included and an upper vamp section 211 formed of sheet of air-permeable natural or synthetic fiber or natural or synthetic leather. The upper vamp section 211 may be connected mainly to the toe cap portion 207a of the connecting member 207 is a known manner, but preferably connected by means of a connecting member formed integral with the toe cap section 207a and/or the section 207b.

This shoe is manufactured by an appropriate one of the methods as described heretobefore or a modification thereof, and material for said shoe is the same as used in said method or modification thereof.

Referring now to FIGS. 62 to 66, some embodiments of the method, apparatus and shoe of the present invention are described below.

The sole 200 is molded of hard vinyl chloride, polyurethane or thermoplastic synthetic rubber in a cavity for the first molding in a metallic mold, and within 10 seconds thereafter, a lateral side section 1 of upper is molded of hard vinyl chloride, polyurethane or thermoplastic synthetic rubber in a cavity for the second molding obtained by modifying of said first cavity whereby the soft sole and the hard lateral side section of upper can be integrally formed.

Further, in said molding, by mounting or temporarily attaching at a required position of said cavity of the mold an upper vamp section 25 or 56 of natural or synthetic leather, or natural or synthetic fiber or the like, said upper vamp section is connected to the lateral side section by making use of fusion of vinyl chloride, polyurethane or synthetic rubber. In case of the upper vamp section of leather or the like, a number of openings 220 are so provided that molten material can penetrate into said openings as shown in FIGS. 38, 57, 59, 30 or 31.

A cover section 221 covering a cut-away portion 230 of the lateral side section 1 of upper is temporarily attached in the required portion of the cavity similarly to said upper vamp section 25 or 56, and connected to the lateral side section by said molding.

| Composition for sole material | | |
|---|---|---|
| hard ethylene-vinylacetate copolymer resin | copolymer resin including 15% of vinylacetate | 100 parts |
| | foaming agent (azodicarbonazide) | 0.7 part |

| Composition for upper material | | |
|---|---|---|
| soft ethylene-vinylacetate copolymer resin | copolymer resin including 30% of vinylacetate | 100 parts |
| | foaming agent (azodicarbonazide) | 0.7 part |

A method and apparatus, modified from those as disclosed in U.S. Pat. No. 3,671,621, may be used in manufacturing the present shoes. Methods and apparatus developed by Desma-Werke GmbH in Federal Republic of Germany being famous in offering DESMA 702, DESMA 608+609, DESMA V810, DESMA 703/704 and DESMA 700M.

A sole is molded of the said material together with a lateral side section of upper of the said material under the same step or under the differential steps while the upper per se may be molded together with the sole. An integrated sole and lateral side section formed of two kinds of material is obtained.

As abovementioned, according to the present invention, by a series of operations an integrated sole and lateral side section of upper or a shoe formed of two kinds of material can be economically and successively manufactured, in which the sole portion is formed, e.g., of relatively durable first material while the lateral side section is formed, e.g., of relatively soft second material.

By making some modification of the apparatus as required and providing three or more nozzles, an integrated sole and lateral side section or a shoe formed of three or more kinds of material can be manufactured according to the present invention.

Figure 62:
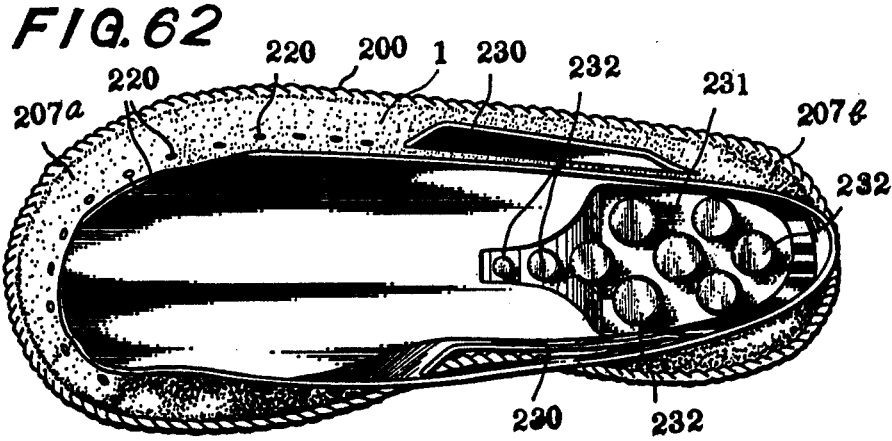
FIG. 62 is a plan view of a sole integrally provided with a lateral side section of upper.
Figure 63:
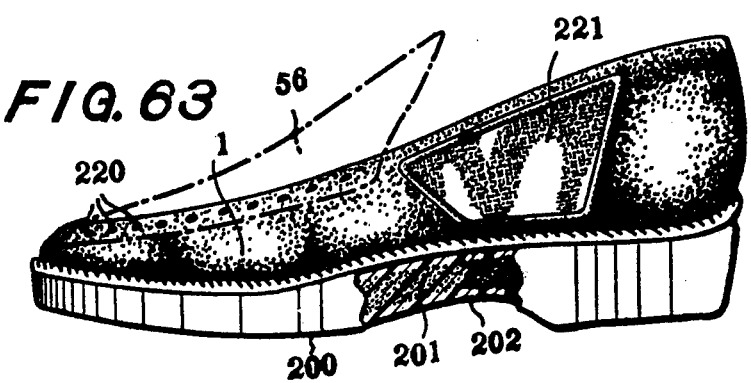
FIG. 63 is a front view of the sole of FIG. 62.
Figure 64:
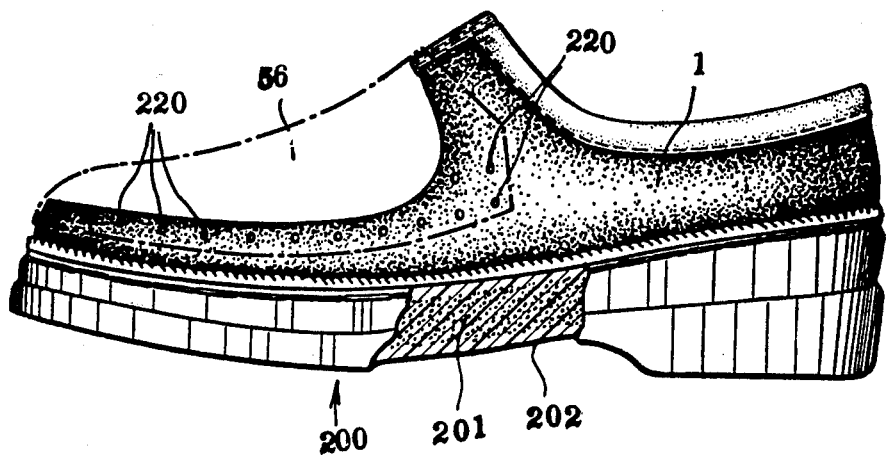
FIG. 64 is a front view of another modification.
Figure 65:
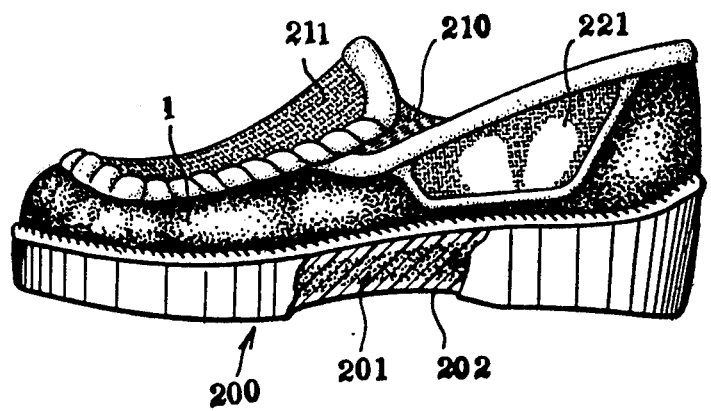
FIG. 65 is a front view of a further modification.

Referring to FIG. 62, shown are recesses 231 and cylindrical cushioning members 232 extending from said recesses 231.

Figure 66:
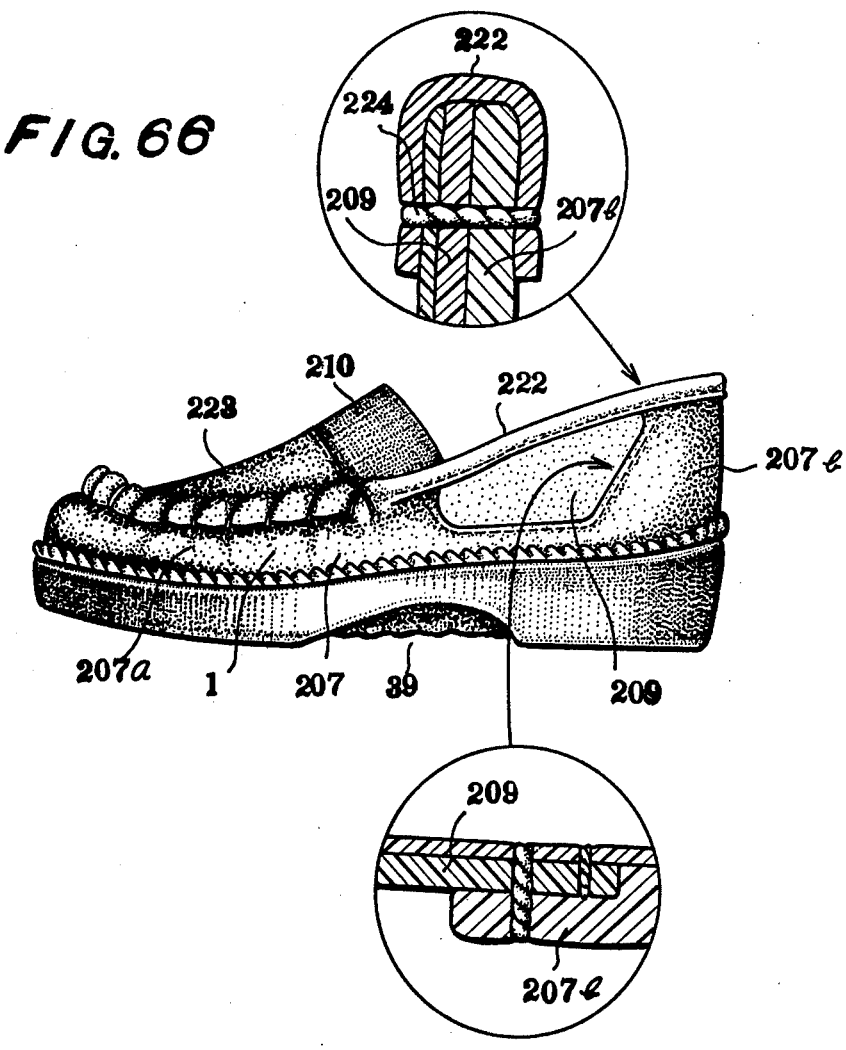
FIG. 66 is a front view of a further modification.

Referring to FIG. 66, an elastic band is provided adjacent an upper vamp section 223 made of natural or synthetic leather. A lateral side section 207 and intermediate section 209, are covered on the uppermost edges thereof by a tape 222 bound by a conventional adhesive agent under assistance of a thread 224.

When molding the lateral side section including or not including the upper vamp section as shown in the preferred drawings among those explained heretobefore, the conventional material for lining or backing may be previously positioned at some place within the cavity of the mold and then material being bound to the inside of the lateral side section at the same time with the subject molding or may be fixed to the inner faces of the lateral side section after the molding. The shape-retaining and connecting member, e.g. 122 as shown in FIG. 44 may include the toe cap section and/or the counter section.

Further, the conventional material for lining or backing the inside of the lateral side section may be adhered to the shape-retaining and connecting member by a conventional adhesive agent previously applied to the material while if necessary the adhered portion of the material and the shape-retaining and connecting member is further bound by the machine sewing or hand sewing.

The ones preferable among methods according to the present invention are set forth below.

1. A method for manufacturing an instep cover section of a footwear, comprising placing an instep cover member preformed so as to constitute at least a part of the instep cover section e.g. an upper, a band or the like in a molding cavity of a mold adapted to clamp-mold the instep cover member in a required three-dimensional shape by the close of the cavity itself and provided with a space into which synthetic resin material is flowed so as to contact with at least a part of the instep cover member, pressure-injecting molten synthetic resin material into the cavity when the instep cover member has been clamp-molded by closing the cavity, and thus connecting the synthetic resin material with the instep cover member whereby the synthetic resin material and the instep cover member form at least the main part of the three-dimensional instep cover section of a footwear.

2. A method for manufacturing an instep cover section of a footwear, comprising placing an instep cover member preformed so as to constitute at least a part of the instep cover section e.g. an upper, a band or the like in a molding cavity of a mold adapted to clamp-mold the instep cover member in a required three-dimensional shape by the close of the cavity itself and provided with a space into which synthetic resin material is flowed so as to contact with at least a part of the instep cover member and another space for molding a sole communicated with the said former space, pressure-injecting molten synthetic resin material into the cavity when the instep cover member has been clamp-molded by closing the cavity, and thus connecting the synthetic resin material with the instep cover member whereby the synthetic resin material and the instep cover member form at least the main part of the three-dimensional instep cover section of a footwear.

3. A method for manufacturing an instep cover section of a footwear, comprising placing an instep cover member preformed so as to constitute at least a part of the instep cover section e.g. an upper, a band or the like in a molding cavity of a mold adapted to clamp-mold the instep cover member in a required three-dimensional shape by the close of the cavity itself and provided with a space for molding a connecting section, further placing another preformed instep cover member to be put adjacent to the former instep cover member in the said cavity, pressure-injecting molten synthetic resin material into the cavity when the instep cover member has been clamp-molded by closing the cavity, and thus integrally connecting at least both of the adjacent instep cover members by means of the connecting member molded in the said connecting member molding space whereby at least the main part of the instep cover section of a footwear is formed.

4. A method for manufacturing a footwear, comprising placing an instep cover member preformed so as to constitute at least a part of an instep cover section e.g. an upper, a band or the like in a molding cavity of a mold adapted to clamp-mold at least a part of the instep cover section and provided with a space for molding a sole into which synthetic resin material is injected, pressure-injecting molten synthetic resin material into the molding cavity when at least a part of the instep cover section is clamp-molded by closing the mold and thus connecting the synthetic resin material with at least a part of the said instep cover section whereby the instep cover section and the sole are integrally formed.

5. A method for manufacturing a footwear comprising placing an instep cover member preformed so as to constitute at least a part of the instep cover section e.g. an upper, a band or the like in a molding cavity of a mold adapted to clamp-mold the instep cover member in a required three-dimensional shape by the close of the cavity itself and provided with a space for molding a connecting member and another space for molding a sole communicated with the former space, further placing another preformed instep cover member to be put adjacent to the former instep cover member in the said cavity, pressure-injecting molten synthetic resin material into the cavity when the instep cover member has been clamp-molded by closing the cavity, and thus integrally connecting at least both of the adjacent instep cover members together by means of the connecting member molded in the connecting member molding space, the said connecting member being integral with the sole molded in the sole molding space whereby at least the main part of the instep cover section and the sole are integrally formed.

An example of a composition used for the said method is set forth below.

A resin composition of non-rigid foamed vinyl chloride resin:

| | | |
|---|---|---|
| vinyl chloride | 100 | parts |
| plasticizer (D.O.P) | 80 | parts |
| stabilizer (OF-14 by Adeka Aagas Co. Ltd.) | | |
| foaming agent (Azodicarbon amide) | 0.5 | part |

An example of molding conditions is set forth below,

| | |
|---|---|
| molten resin temperature | 170 – 180° C |
| clamping pressure | 70 – 150 kg/cm² |
| injecting pressure | 50 – 140 kg/cm² |
| cooling time | about 30 seconds |
| mold temperature | 80 – 100° C |
| injecting time | 1 – 1¾ second |

The said conditions are also applied when E.V.A resin is used.

A footwear, slipper or the like is manufactured by the said methods, using the said resin composition under the said conditions. One of such examples is as follows.

Figure 68:
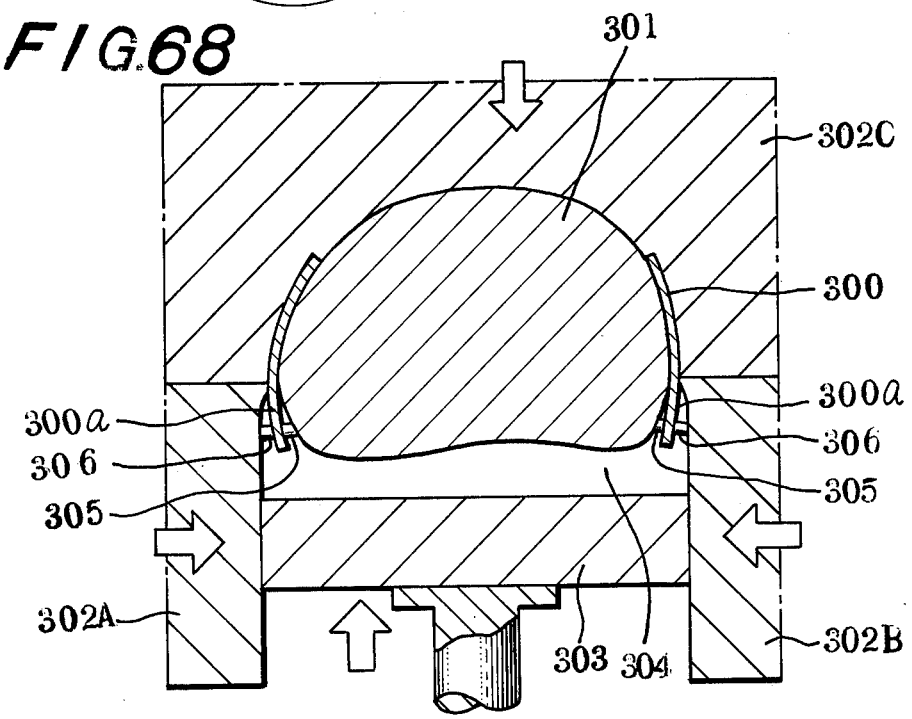
FIG. 68 is a cross section of mold assembly and an upper.
Figure 69:
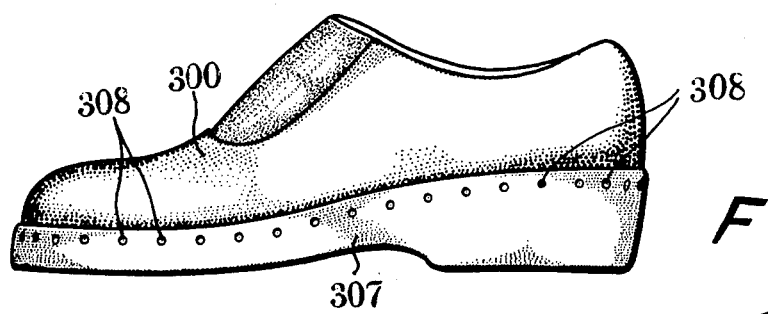
FIG. 69 is a side view of a shoe manufactured by means of the mold assembly of FIG. 68.

FIG. 68 illustrates molds for manufacturing a shoe as shown in FIG. 69. There are shown an upper 300 formed of synthetic leather, a male mold 301, divided female molds 302A – 302C and a bottom mold 303, said divided female molds 302A – 302C and said bottom mold 303 defining a molding cavity 304, while the said male mold 301 and divided female molds 302A – 302C are provided integrally with a plurality of cylindrical projections 305 . . . , 306 . . . throughout the whole periphery of the sections of the shoe.

In manufacturing a shoe, firstly an upper 300 is mounted on the male mold 301, and then the female mold 302C is pressed on the male mold 301 at 100 kg/cm² clamping pressure. Then the bottom mold 303, the female molds 302A and 302B are set in place, thereby the sole molding cavity 304 being defined. The lower peripheral edge 300a of the upper 300 supported by the male mold 301 and the female mold 302C is protruded into the molding cavity 304 and securely supported at the outer and inner surfaces thereof by a plurality of projections 305 . . . and 306 . . . Each projection 305 has a cylindrical shape, extending integrally from the male mold 301 into the molding cavity 304 and being in contact with the inner surface of the lower peripheral edge 300a of the upper 300. Further, each projection 306 has a cylindrical shape similarly to the projection 305, extending integrally from the female molds 302A and 302B and being in contact with the outer surface of the lower peripheral edge 300a of the upper 300.

Then, sole molding material as above (or material consisting of 100 parts of vinyl chloride resin, 70 parts of plasticizer (DOP), 0.5 part of smoothing agent (stearic acid), 4 parts of coloring agent and the like) is injected under the said condition [or under an injection pressure of about 60 kg/cm² for about one minute through an injection opening (not shown)] into the molding cavity 304. In this case, the molds 301, 302A, 302B, 302C and 303 have a temperature of about 80° C. Then, the molds are cooled for about 30 seconds to about 50° C. By thus cooling the molds, the material in the molding cavity 304 is hardened, whereby a sole 307 is formed and at the same time said sole 307 and the upper 300 are integrally connected. Thus a sport shoe is shown in FIG. 69 is obtained. By means of the projections 305 . . . and 306 . . . , through holes 308 . . . are formed in the peripheral edge of the sole 307, and the upper surface consealed in the sole is partly exposed through the said through holes to represent an openwork. By coloring the upper 300 and the sole 307 in contrast to each other, colorful decoration is provided in addition to said openwork.

Figure 70A:
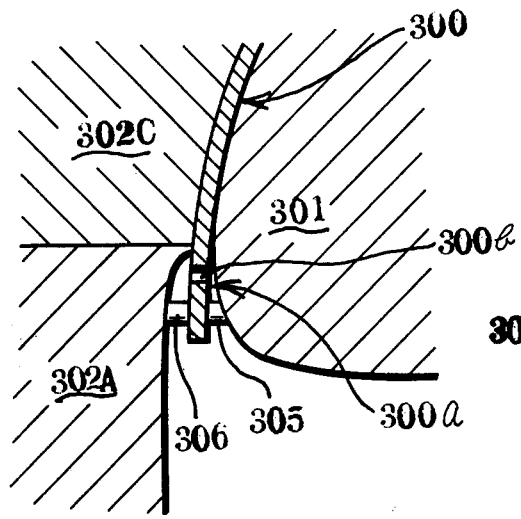
FIG. 70a is a partly enlarged section of the mold assembly of FIG. 68.
Figure 70B:
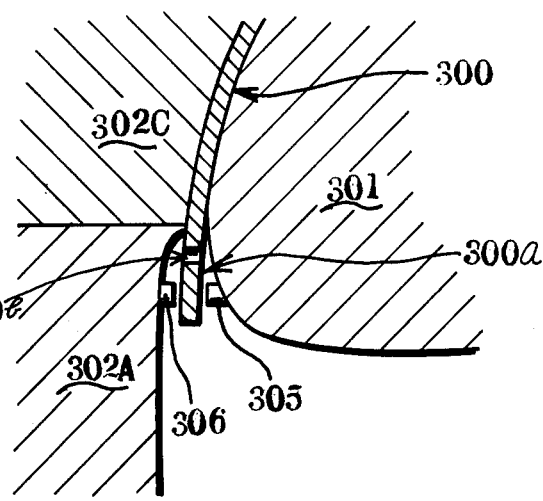
FIG. 70b is a section similar to FIG. 70a, but projections not being in contact with the protruded part.

If a through opening 300b is provided in the end portion 300a of the upper 300 protruded into the cavity, injected resin material on both sides of the end portion 300a are communicated through the opening with each other, thereby ensuring the connection. FIG. 70b illustrates an embodiment in which projections 305 . . . and 306 . . . are not in contact with but suitably spaced from the end portion 300a. In this case, only recesses are formed in the molded sole and the surface of the end portion 11a are not exposed.

Figure 71:
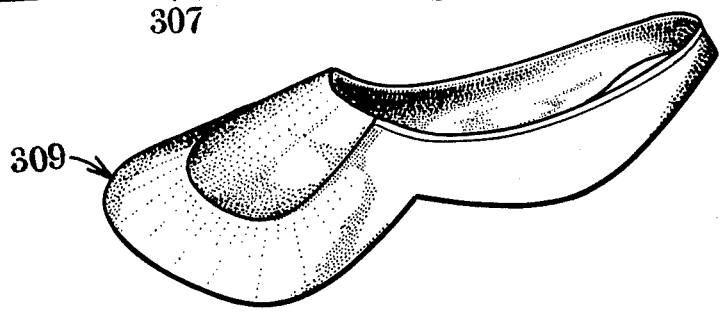
FIG. 71 is a perspective view of the upper provided with an upper vamp section.

An upper vamp section 309 as shown in FIG. 71 is formed of synthetic resin. The lower peripheral edge of the upper vamp section 309 is adapted to be connected with a lateral side section having an insole which is to be provided later.

Figure 72:
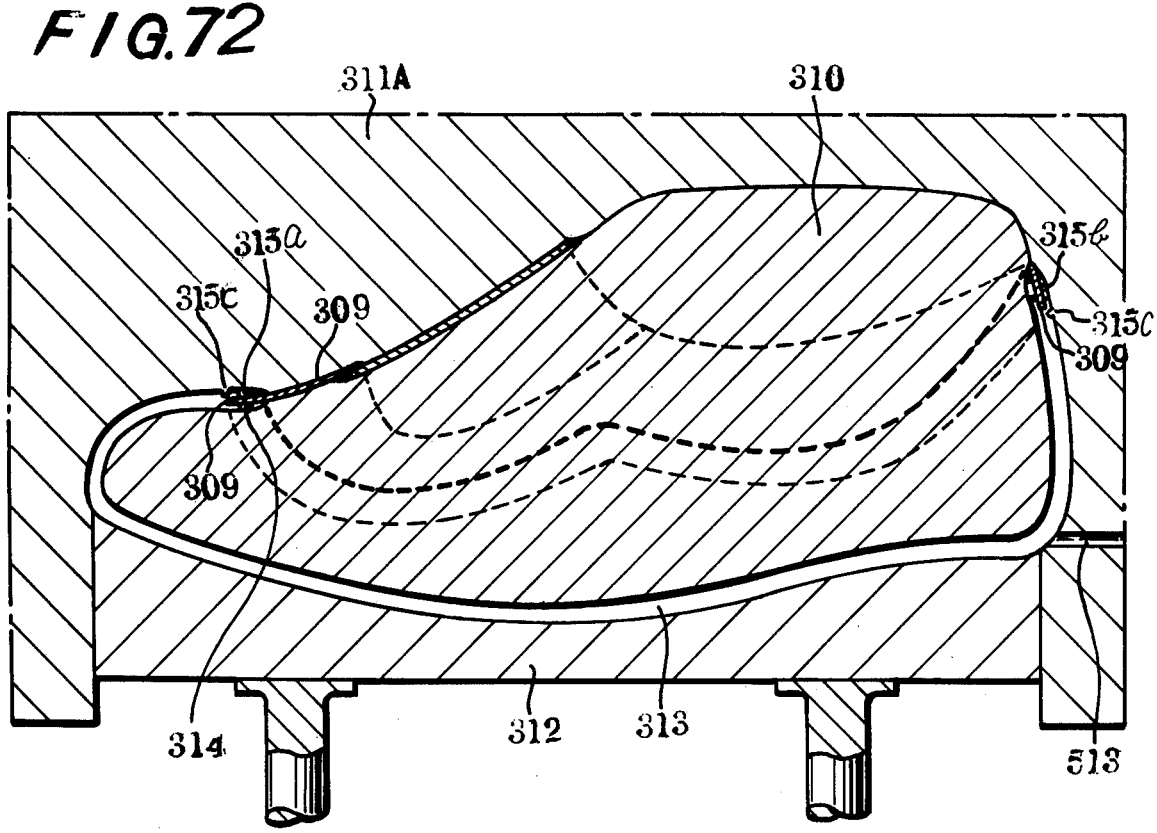
FIG. 72 is a longitudinal section of the mold assembly holding therein the upper of FIG. 71.
Figure 73:
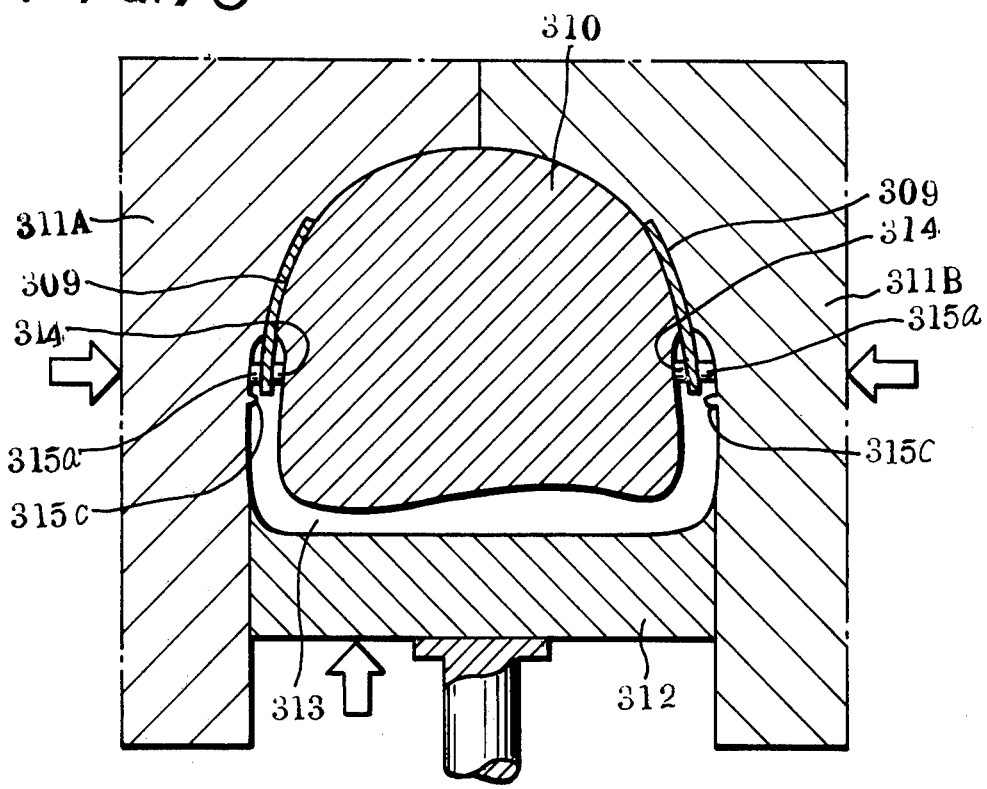
FIG. 73 is a cross section of the molds of FIG. 72.
Figure 74:
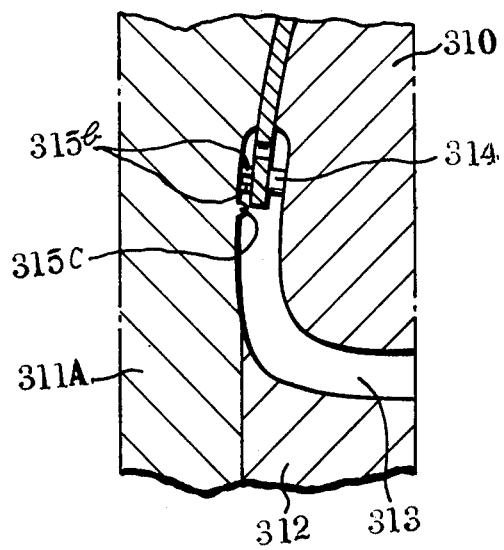
FIG. 74 is a partly enlarged view of the mold assembly of FIGS. 72 and 73.

As shown in FIGS. 72 and 73, the upper vamp section 309 is mounted on a male mold 310 and then female molds 311A and 311B are pressed on the male mold 310 at a clamping pressure of about 90 kg/cm² while a bottom mold 312 is put in place, whereby a cavity 313 for molding an insole and a lateral side section is defined by the molds 310, 311A, 311B and 312. The lower peripheral edge of the upper vamp section 309 are protruded into the molding cavity 313 (especially the part thereof for molding a lateral side section), and supportedly secured in a predetermined position by a number of projections 314 . . . 315a . . . and 315b . . . extended from the male mold 310 and the female molds 311A and 311B into the molding cavity. The projections 314 . . . and 315a . . . have cylindrical shape of similar size. Each projection 315b has the same length with the projection 315a but a smaller diameter. Every two projections 315b, 315b are provided between projections 315a, 315a on the side of the female mold 311A and 311B as shown especially in FIG. 75. Further, the female molds 311A and 311B are provided with a linear projection 315C below the projections 315a . . . and 315b . . .

After the upper vamp section 309 is put in place with respect to the molds as abovementioned, synthetic resin material of the similar composition to the sole molding material used in above is injected under an injecting pressure of about 70 kg/cm² for about 1 minute through an injection opening. In this case, the molds 310, 311A, 311B and 312 have a temperature of about 90° C. Then the molds are cooled for 40 seconds to about 50° C. Removing the molds, a shoe as shown in FIG. 76 is obtained. In the drawing are shown a lateral side section 320 connected to the lower peripheral edge of the preformed upper vamp section 309, and an insole 321 molded at the same time with the lateral side section 320. Further, there are shown a number of through holes 322a . . . and 322b . . . formed in the upper peripheral edge of the lateral side section 320 by means of the projections 315a . . . and 315b . . . respectively, and a groove 322 formed by the linear projection 315C. The outer surface of the lower peripheral edge portion of the upper vamp section 309 is partly exposed through the through holes 322a . . . and 322b . . . Ordinarily, such a shoe manufactured as above is further provided with a sole 323 as illustrated in FIG. 76 with an imaginary line. However, a preformed sole 323 may be connected to the insole 321 and the lower portion of the lateral side section 320 with an adhesive agent or by seaming. Otherwise, a sole may be molded by providing a sole molding cavity and at the same time the sole may be connected to an insole or a lateral side section.

FIG. 77 illustrates an example in which synthetic leather lining 324 is mounted over the male mold 310 prior to disposing the upper vamp section 309 thereon. In this case, projections 314 . . . of the male mold 310 are in contact through the lining 324 with the lower peripheral edge of the upper vamp section 309.

Figure 80:
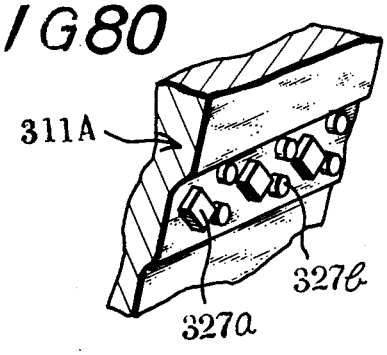
Figure 81:
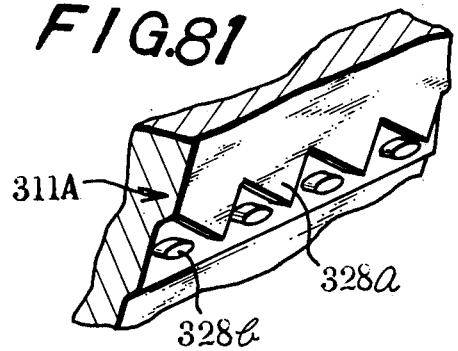
Figure 75:
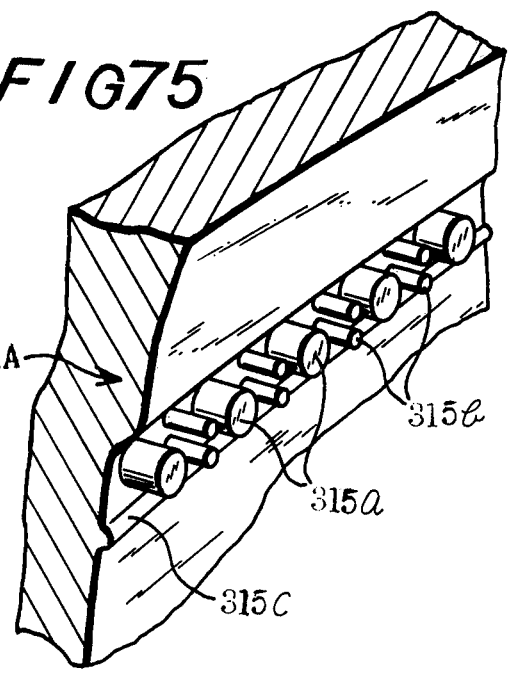
FIG. 75 is a perspective view of a part of the mold assembly of FIGS. 72 and 73, especially illustrating projections.

FIG. 78 illustrates a modification of the projections in a mold as shown in FIG. 75, in which the female mold 311A is provided with rectangular and circular sectioned projections 325a . . . and 325b . . . arranged in an alternative succession. By using such a female mold, the connecting part between the upper vamp section 309 and the lateral side section 320 is provided with a pattern of a combination of sawtoothed line and circles formed by the through holes 326a . . . and 326b . . . Fig. 80 illustrates an example in which the female mold 311A is provided with rhombic projections 327a . . . and circular projections 327b . . . , while FIG. 81 illustrates another example in which the female mold 311A is provided with a wave shaped projection 328a comprising a series of triangular projections and elliptical projections 328a . . .

Figure 82:
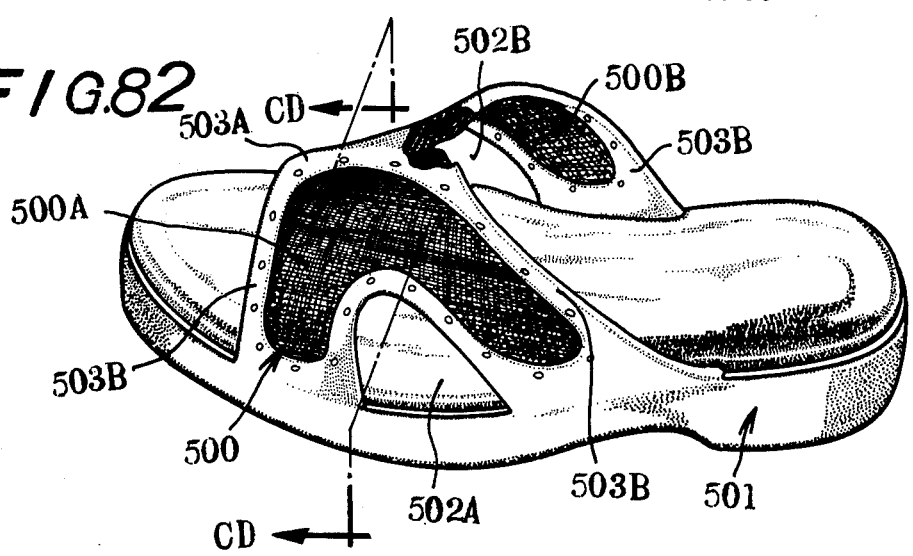
FIG. 82 is a perspective view of a sandal manufactured by the mold assembly.
Figure 83:
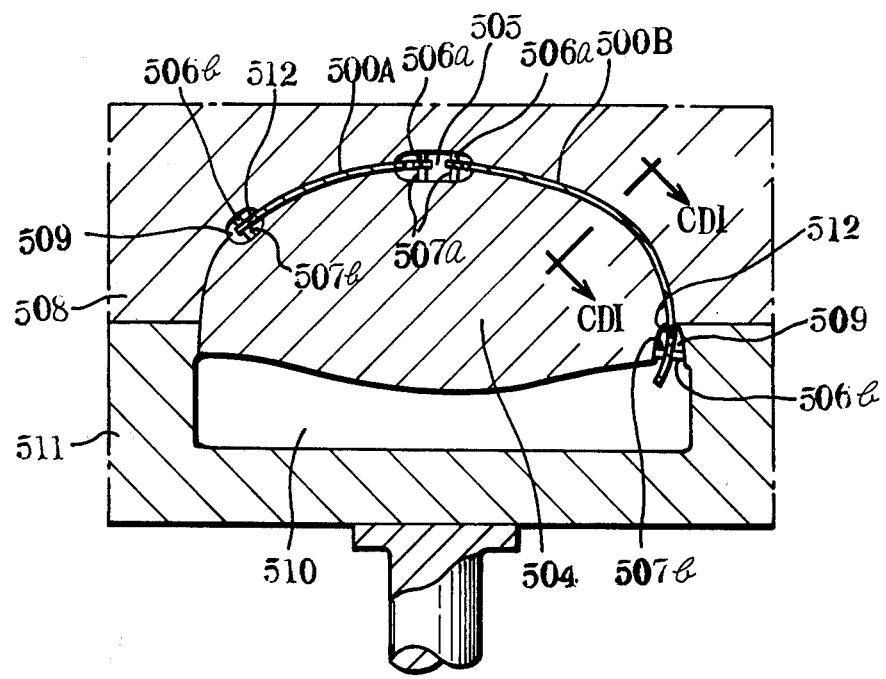
FIG. 83 is a lateral section of a mold assembly for manufacturing the sandal of FIG. 82 taken along the line 400 — 400 therein.
Figure 84:
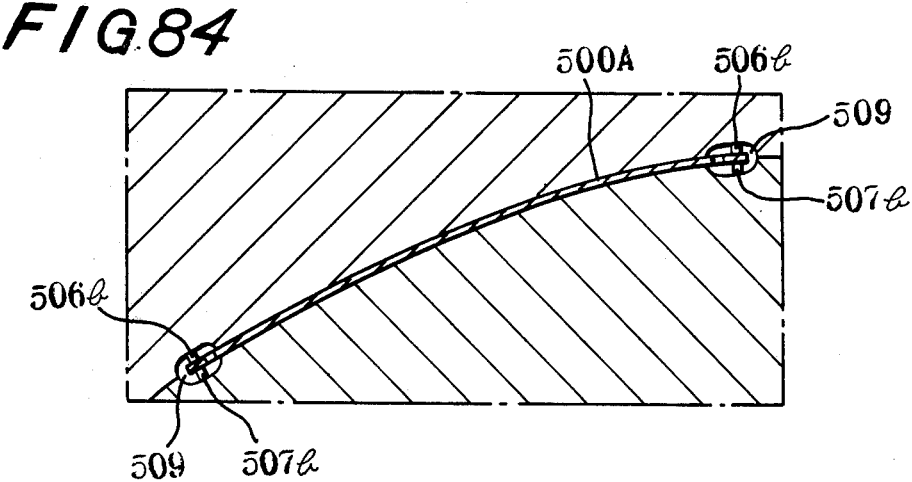
FIG. 84 is a section taken along the line 401 — 401 of FIG. 83.

FIG. 82 illustrates a sandal manufactured by molds as shown in FIG. 83. The sandal comprises a band 500 consisting of band section elements 500A and 500B and a sole 501. The band section elements 500A and 500B are provided with cut-away portions 502A and 502B respectively and formed of porous woven cloth, leather, synthetic resin material or the like, the two elements 500A and 500B being integrally connected together at their adjacent margins in the center of the band by means of a connecting member 5003A. The other end of each band section element is embedded into the sole 501. Further, the peripheral portion of each band section element is covered with flange members 5003B. In manufacturing the sandal, as shown in FIG. 83, firstly the band section elements 500A and 500B are mounted on the male mold 5004, one end of each band section element being inserted into a molding cavity 5005 for molding a connecting member and supported between and by the projections 506a . . . , 507a . . . integrally protruded from a divided female mold 508 and the male mold. The peripheral margin of each band section element is inserted into a molding cavity 509 for molding a flange member and supported between and by the projections 506b . . . and 507b . . . The other end of each band section element is protruded from the flange member molding cavity 509 into the sole molding cavity 510, the said end being also supported by the projections 506b . . . and 507b . . . Preferably, the ends of the band section elements protruded into the connecting member molding cavity 5005 and the flange member molding cavity 509 are provided with through holes. After the band 500 is put in place in the molding cavity, the said connecting member molding cavity 5005, the flange member molding cavity 509 and the sole molding cavity 510 are filled by injection with synthetic resin material having a similar composition to that of the molding material used in above. When the material is hardened, the band section elements 500A and 500B are connected with each other and at the same time the flange is formed at the peripheral portion of the band section elements, the band 500 and the sole 501 being also integrally connected with each other.

As mentioned above, according to the present invention, sections forming a footwear can be connected with each other substantially without any defect and at the same time the connecting portions are provided with decrations through openwork effect, improving production efficiency and the quality of a footwear and thereby affording to provide an economical and excellent footwear.

What I claim is:

1. In a method for manufacturing a shoe, the improvement comprising injection molding a three-dimensional lateral side section from molten resinous material in a cavity of a molding machine, injection molding a sole from molten resinous material in the molding machine integrally together with said molded lateral side section, and connecting an upper section to said lateral side section.

2. The method of claim 1 wherein the lateral side section is molded before the sole, the sole being integrally connected to the lateral side section during the molding of the sole by molten resinous material which forms the sole flowing around portions of the lateral side section.

3. The method of claim 1 wherein the lateral side section and the sole are molded at the same time in the same molding cavity of the molding machine.

4. In a method for manufacturing a shoe, the improvement comprising positioning an upper section of the shoe in a molding machine, three dimensionally injection molding a lateral side section of the shoe from resinous material in the molding machine, the lateral side section being connected to the upper section during the molding step by molten resinous materal which forms the lateral side section flowing around portions of the upper section, and injection molding a sole of plastic resinous material in the molding machine which is connected to the lateral side section.

5. The method of claim 4 in which the lateral side section and the sole are simultaneously integrally molded together.

6. The method of claim 4 in which the sole is molded after the lateral side section and is connected to the lateral side section during the molding of the sole by molten resinous material which forms the sole flowing around portions of the lateral side section.

* * * * *